US011683145B2

(12) United States Patent
Xiong et al.

(10) Patent No.: US 11,683,145 B2
(45) Date of Patent: *Jun. 20, 2023

(54) PREEMPTION INDICATIONS FOR NEW RADIO

(71) Applicant: Apple Inc., Cupertino, CA (US)

(72) Inventors: Gang Xiong, Beaverton, OR (US); Sergey Panteleev, Nizhny Novgorod (RU); Debdeep Chatterjee, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/536,471

(22) Filed: Nov. 29, 2021

(65) Prior Publication Data

US 2022/0140977 A1 May 5, 2022

Related U.S. Application Data

(63) Continuation of application No. 16/637,659, filed as application No. PCT/US2018/046038 on Aug. 9, 2018, now Pat. No. 11,218,271.

(Continued)

(51) Int. Cl.
*H04L 5/00* (2006.01)
*H04W 76/27* (2018.01)
*H04W 72/23* (2023.01)

(52) U.S. Cl.
CPC .......... *H04L 5/0053* (2013.01); *H04L 5/0064* (2013.01); *H04L 5/0094* (2013.01); *H04W 72/23* (2023.01); *H04W 76/27* (2018.02)

(58) Field of Classification Search
CPC ... H04L 5/0053; H04L 5/0064; H04L 5/0094; H04L 5/0096; H04W 76/27; H04W 72/044; H04W 72/0493; H04W 72/23
See application file for complete search history.

(56) References Cited

U.S. PATENT DOCUMENTS 10,887,073 B2 * 1/2021 Zhou ................... H04W 76/38
11,218,271 B2 * 1/2022 Xiong .................. H04L 5/0094
(Continued)

FOREIGN PATENT DOCUMENTS

CN 102754476 10/2012
CN 103650403 3/2014
(Continued)

OTHER PUBLICATIONS

Huawei, Hisilicon; "On pre-emption indication for DL multiplexing of URLLC and eMBB"; 3GPP TSG RAN WG1 Ad Hoc Meeting; R1-1715409; Nagoya, Japan, Sep. 2017; 15 pgs.
(Continued)

*Primary Examiner* — Diane L Lo
*Assistant Examiner* — Abusayeed M Haque
(74) *Attorney, Agent, or Firm* — Kowert, Hood, Munyon, Rankin & Goetzel, P.C.

(57) ABSTRACT

Embodiments of dynamic multiplexing are described, including the transmission of preemption indication (PI) to indicate preemption of time-frequency resources. In some embodiments, a next Generation NodeB (gNB) is configured to transmit PIs in signaling to preempt an enhanced Mobile Broadband (eMBB) communications transmission with an ultra-reliable and low latency communications (URLCC) transmission. In some embodiments, a user equipment (UE) is configured to monitor a region of time-frequency resources, within a bandwidth part (BWP), for a PI. The PI indicates to the UE a portion of time-frequency resources that omit transmissions intended for the UE. In some embodiments, the gNB transmits the PI to the UE within preemption indication downlink control information (PI-DCI) in a physical downlink control channel (PDCCH) in a control resource set (CORESET). In some embodiments, the BWP is defined according to a frequency domain location,
(Continued)

a bandwidth, and a subcarrier spacing for a given numerology.

20 Claims, 12 Drawing Sheets

Related U.S. Application Data

(60) Provisional application No. 62/556,990, filed on Sep. 11, 2017, provisional application No. 62/543,647, filed on Aug. 10, 2017.

(56) References Cited

U.S. PATENT DOCUMENTS

| | | | |
|---|---|---|---|
| 2014/0071878 A1 | 3/2014 | Xu | |
| 2018/0035332 A1 | 2/2018 | Agiwal et al. | |
| 2018/0070341 A1 | 3/2018 | Islam et al. | |
| 2019/0044649 A1* | 2/2019 | Kim | H04L 5/0053 |
| 2019/0082431 A1* | 3/2019 | Yi | H04L 5/0053 |
| 2019/0165984 A1* | 5/2019 | Shapin | H04L 5/0064 |
| 2019/0208482 A1 | 7/2019 | Tooher et al. | |
| 2019/0222284 A1* | 7/2019 | Huang | H04L 5/0051 |
| 2019/0246395 A1* | 8/2019 | Huang | H04L 5/0003 |
| 2019/0342874 A1 | 11/2019 | Davydov et al. | |
| 2019/0363833 A1 | 11/2019 | Wang et al. | |
| 2020/0022429 A1* | 1/2020 | Nack | A41D 19/0048 |
| 2020/0205059 A1 | 6/2020 | Khoshnevisan et al. | |
| 2020/0213984 A1 | 7/2020 | Hwang et al. | |
| 2020/0351847 A1* | 11/2020 | Kim | H04W 72/0446 |
| 2021/0037552 A1* | 2/2021 | Chen | H04L 5/0044 |
| 2021/0092717 A1 | 3/2021 | Takeda et al. | |
| 2021/0152312 A1 | 5/2021 | Xiong et al. | |
| 2021/0168836 A1 | 6/2021 | Takeda et al. | |
| 2022/0256519 A1* | 8/2022 | Jeon | H04W 72/044 |

FOREIGN PATENT DOCUMENTS

| | | | |
|---|---|---|---|
| CN | 104303440 | 1/2015 | |
| CN | 105075138 | 11/2015 | |
| CN | 104782065 | 3/2016 | |
| CN | 105393618 | 3/2016 | |
| WO | 2016022849 | 2/2016 | |
| WO | 2017048324 | 3/2017 | |
| WO | WO-2020262202 A1 * | 12/2020 | H04L 5/0053 |
| WO | WO-2022013783 A1 * | 1/2022 | H04W 72/12 |

OTHER PUBLICATIONS

European Office Action; Application No. 18843749.5; dated Aug. 10, 2022; 8 pgs.
ZTE, "About pre-emption indication", R1-1710123, 3GPP TSG RAN WGI NR Ad-Hoc #2, Qingdao, China, Jun. 17, 2017, See section 2; and figures 1, 3.
NTT Docono, Inc., "Pre-emption indication for downlink", R1-1711119, 3GPP TSG RAN WG1 NR Ad-Hoc #2, Qingdao, P.R. China, Jun. 17, 2017, See section 2.
Intel Corporation, "Remaining details of DL pre-empt indication", R1-1710575, 3GPP TSG RAN WG1 NR Ad-Hoc #2, Qingdao, P.R. China, Jun. 17, 2017, See sections 2.2.1-2.2.2.
Intel Corporation, "eMBB/URLLC multiplexing for DL", R1-1704763, 3GPP TSG RAN WG1 Meeting #88bis, Spokane, USA, Mar. 25, 2017, See section 3.
Intel Corporation, "Open issues for wider bandwidth operations", R1-1710583, 3GPP TSG RAN WG1 NR Ad-Hoc #2, Qingdao, P.R. China, Jun. 17, 2017, See sections 2.2.1-3.1.1.
International Search Report and Written Opinion for PCT/US2018/046038 dated Dec. 3, 2018.
Huawei, Hisilicon; "On bandwidth part and bandwidth adaptation"; 3GPP TSG RAN WG1 Meeting #89 R1-1706900; Hangzhou, China, May 15, 2017. 9 Pages.
Huawei, Hisilicon; "On bandwidth part and bandwidth adaptation"; 3GPP TSG RAN WG1 Meeting #89; Hangzhou, China; May 19, 2017; 9 Pages.
Extended European Search Report For Patent Application No. EP18843749; dated Nov. 2, 2020; 14 Pages.
Office Action for Chinese Patent Application No. 2018800605439; dated Jan. 5, 2023.
Nokia et al. "Resource sharing between PDCCH and PDSCH in NR"; 3GPP TSG-RAN WG1 Ad Hoc Meeting #2 R1-1710983; Qingdao, China; Jun. 27, 2017.
Wilus Inc. "Contents and structure of group common PDCCH for NR"; 3GPP TSG RAN WG1 Meeting #89 R1-1708974; Hangzhouzhou, P.R. China; May 15, 2017.

* cited by examiner

PREEMPTION INDICATIONS FOR NEW RADIO

PRIORITY CLAIM

This application is a continuation of U.S. patent application Ser. No. 16/637,659, filed Feb. 7, 2020, which is a national stage application of PCT/US2018/046038, filed Aug. 9, 2018, which claims priority to U.S. Provisional Patent Application Ser. No. 62/543,647 filed, Aug. 10, 2017 and U.S. Provisional Patent Application Ser. No. 62/556,990 filed, Sep. 11, 2017 each of which is incorporated herein by reference in its entirety.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

Embodiments pertain to wireless networks and wireless communications. Some embodiments relate to New Radio (NR) 5G networks. Some embodiments relate to methods, computer readable media, and apparatuses for preempting time-frequency resources. Some embodiments relate to ultra-reliable and low latency communications (URLCC) preempting enhanced Mobile Broadband (eMBB) communications.

BACKGROUND

Mobile communication has evolved significantly from early voice systems to today's highly sophisticated integrated communication platform. New Radio (NR) wireless communication systems, or 5G communication systems, will provide ubiquitous access to information and sharing of data for various users and applications. NR is expected to be a unified system targeted to meet vastly different and sometimes conflicting performance dimensions and services. Such diverse multi-dimensional requirements are driven by different services and applications. In general, NR will evolve based on 3rd Generation Partnership Project (3GPP) Long Term Evolution (LTE) Advanced with additional potential NR Access Technologies (RATs) to provide improved, simplified, and seamless wireless connectivity solutions.

The NR use case families, such as enhanced Mobile Broadband (eMBB) and ultra-reliable and low latency communications (URLCC), involve different desired characteristics in terms of user plane (U-plane) latency and coverage levels. Some key desired characteristics for URLLC relate to U-plane latency and reliability. For example, a URLLC target for U-plane latency may be 0.5 milliseconds (ms) for uplink (UL), and 0.5 ms for downlink (DL). A target for reliability, for example, may be $1\times10^{-5}$ within 1 ms. One challenge for NR system design is to enable efficient multiplexing of the eMBB and URLLC services in the same spectrum. Both services may use a large bandwidth (e.g., tens of MHz) but may have different latency requirements that can limit the applicability of simple frequency domain multiplexing, which may lead to the necessity of time domain multiplexing approaches. One simple design is to allow semi-static partitioning of resources in time domain by allocating certain resources for URLLC and eMBB, however this approach may suffer from low efficiency and peak data rate losses of both eMBB and URLLC services. Therefore, new multiplexing approaches are desired for efficient operation of both URLLC and eMBB services in one spectrum.

DESCRIPTION OF EMBODIMENTS

Figure 1:
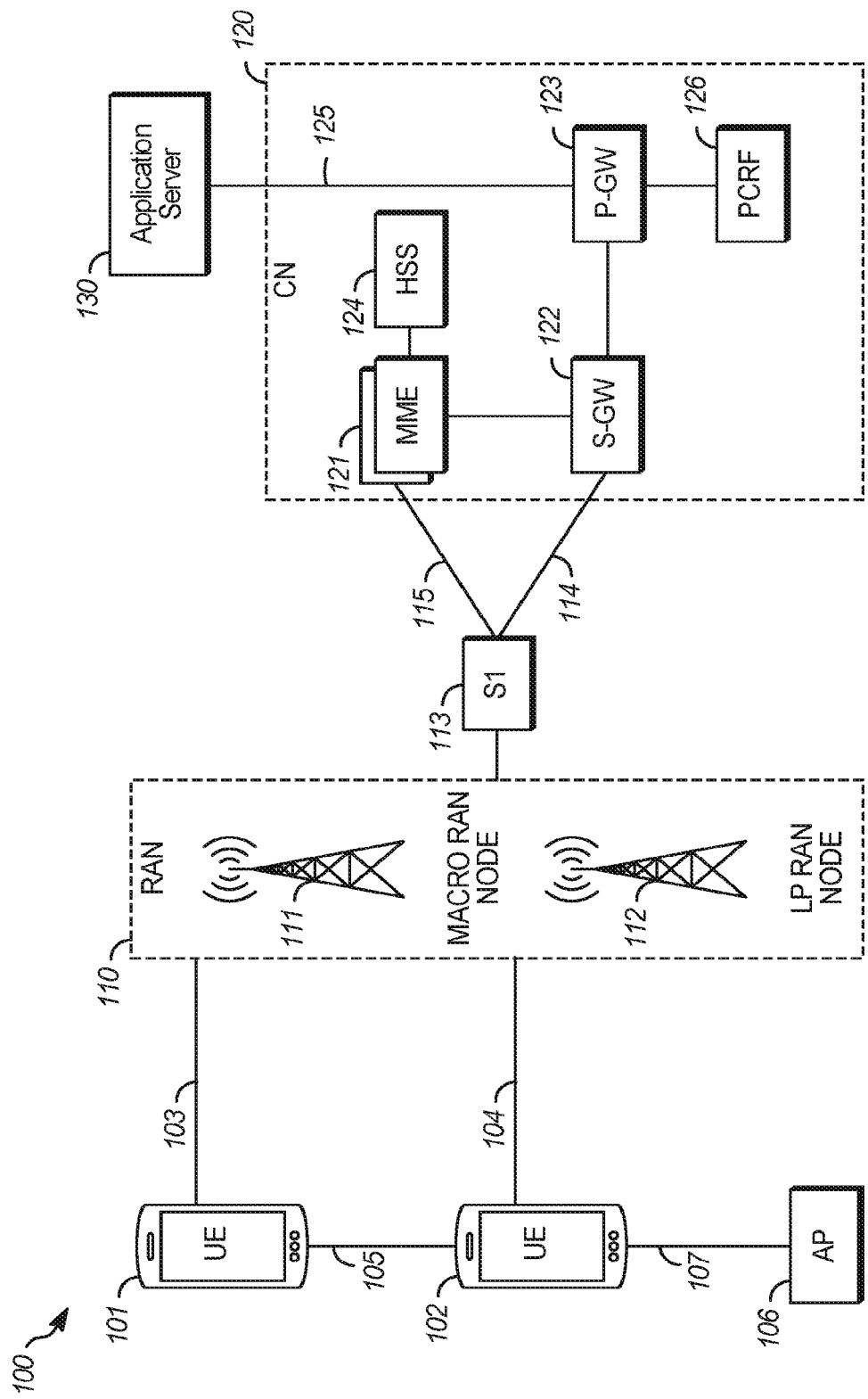
FIG. 1 illustrates an exemplary system architecture of a wireless network in accordance with some embodiments.

FIG. 1 illustrates an architecture of a system 100 of a network in accordance with some embodiments. In some embodiments, the system 100 may be configured for dynamic multiplexing operations, for example, involving preemption of time-frequency resources by certain types of communication signals. In some embodiments, network devices, such as the access nodes described below, can be configured to preempt ongoing eMBB transmissions with URLLC transmissions in time-frequency resources. The access nodes can indicate preemption of time-frequency resources to other network devices, such as user equipment (UE), using preemption indications, as described further below.

The system 100 is shown to include a UE 101 and a UE 102, for example a UE configured for preemption operations. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104, for example, for a dynamic multiplexing and/or preemption operation. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2A:
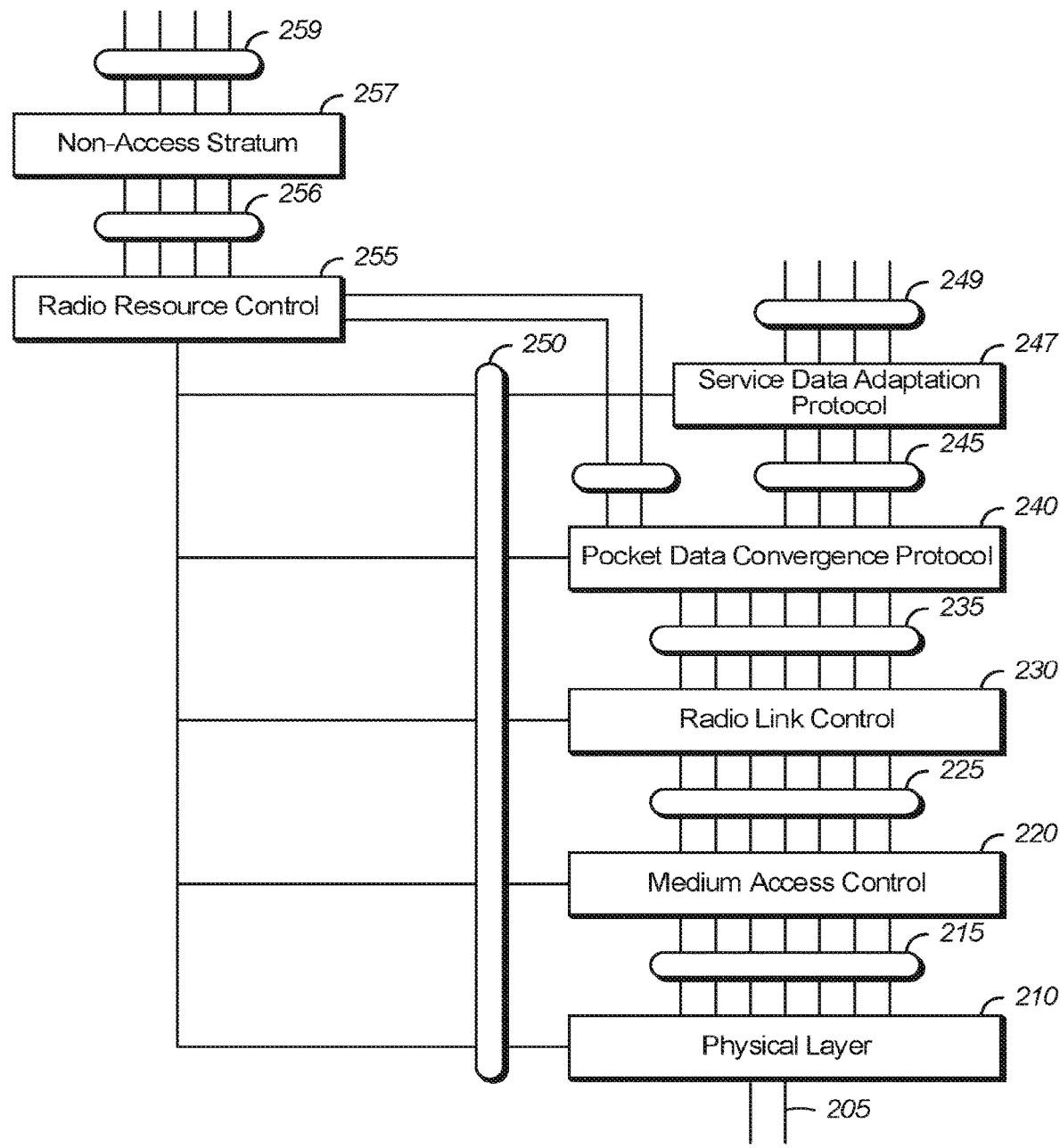
FIG. 2A illustrates protocol functions that may be implemented in a wireless communication device in accordance with some embodiments.

FIG. 2A illustrates protocol functions that may be implemented in a wireless communication device in accordance with some embodiments, for example in a UE or BS configured for preemption operations. In some embodiments, protocol layers may include one or more of physical layer (PHY) 210, medium access control layer (MAC) 220, radio link control layer (RLC) 230, packet data convergence protocol layer (PDCP) 240, service data adaptation protocol (SDAP) layer 247, radio resource control layer (RRC) 255, and non-access stratum (NAS) layer 257, in addition to other higher layer functions not illustrated.

According to some embodiments, protocol layers may include one or more service access points that may provide communication between two or more protocol layers. According to some embodiments, PHY 210 may transmit and receive physical layer signals 205 that may be received or transmitted respectively by one or more other communication devices (e.g., UE 101, UE 102, device 300). According to some aspects, physical layer signals 205 may comprise one or more physical channels. According to some embodiments, an instance of PHY 210 may process requests from and provide indications to an instance of MAC 220 via one or more physical layer service access points (PHY-SAP) 215. According to some embodiments, requests and indications communicated via PHY-SAP 215 may comprise one or more transport channels. According to some embodiments, an instance of MAC 220 may process requests from and provide indications to an instance of RLC 230 via one or more medium access control service access points (MAC-SAP) 225. According to some embodiments, requests and indications communicated via MAC-SAP 225 may comprise one or more logical channels. According to some embodiments, an instance of RLC 230 may process requests from and provide indications to an instance of PDCP 240 via one or more radio link control service access points (RLC-SAP) 235. According to some embodiments, requests and indications communicated via RLC-SAP 235 may comprise one or more RLC channels.

According to some embodiments, an instance of PDCP 240 may process requests from and provide indications to one or more of an instance of RRC 255 and one or more instances of SDAP 247 via one or more packet data convergence protocol service access points (PDCP-SAP) 245. According to some embodiments, requests and indications communicated via PDCP-SAP 245 may comprise one or more radio bearers. According to some embodiments, an instance of SDAP 247 may process requests from and provide indications to one or more higher layer protocol entities via one or more service data adaptation protocol service access points (SDAP-SAP) 249. According to some embodiments, requests and indications communicated via SDAP-SAP 249 may comprise one or more quality of service (QoS) flows. According to some embodiments, RRC entity 255 may configure, via one or more management service access points (M-SAP), embodiments of one or more protocol layers, which may include one or more instances of PHY 210, MAC 220, RLC 230, PDCP 240 and SDAP 247. According to some embodiments, an instance of RRC may process requests from and provide indications to one or more NAS entities via one or more RRC service access points (RRC-SAP).

Figure 2B:
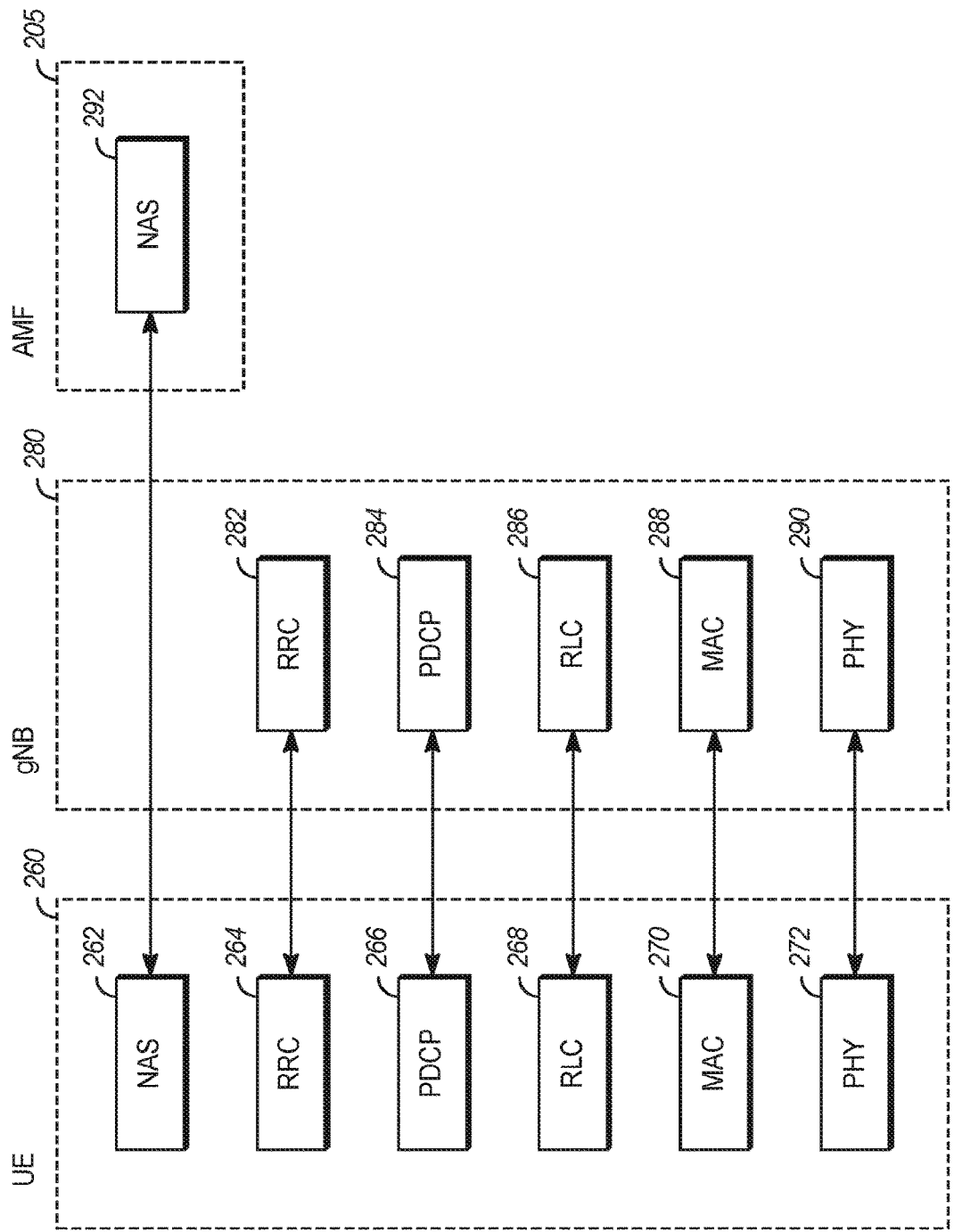
FIG. 2B illustrates protocol entities that may be implemented in wireless communication devices in accordance with some embodiments.

FIG. 2B illustrates protocol entities that may be implemented in wireless communication devices in accordance with some embodiments. For example, protocol entities that may be implemented in wireless communication devices, configured for preemption operations, including one or more of a UE 260 (e.g., UE 101, UE 102, device 300), a base station, which may be termed an evolved node B (eNB), or new radio node B (gNB) 280, and a network function, which may be termed a mobility management entity (MME), or an access and mobility management function (AMF) 294, according to some embodiments.

According to some embodiments, 5GNB 280 may be implemented as one or more of a dedicated physical device such as a macro-cell, a femto-cell or other suitable device, or in an alternative aspect, may be implemented as one or more software entities running on server computers as part of a virtual network termed a cloud radio access network (CRAN). According to some embodiments, one or more protocol entities that may be implemented in one or more of UE 260 (e.g., UE 101, UE 102, device 300), gNB 280 and AMF 294, may be described as implementing all or part of a protocol stack in which the layers are considered to be ordered from lowest to highest in the order PHY, MAC, RLC, PDCP, RRC and NAS. According to some embodiments, one or more protocol entities that may be implemented in one or more of UE 260, gNB 280 and AMF 294, may communicate with a respective peer protocol entity that may be implemented on another device, using the services of respective lower layer protocol entities to perform such communication.

According to some embodiments, UE PHY 272 and peer entity gNB PHY 290 may communicate using signals transmitted and received via a wireless medium. According to some embodiments, UE MAC 270 and peer entity gNB MAC 288 may communicate using the services provided respectively by UE PHY 272 and gNB PHY 290. According to some embodiments, UE RLC 268 and peer entity gNB RLC 286 may communicate using the services provided respectively by UE MAC 270 and gNB MAC 288. According to some embodiments, UE PDCP 266 and peer entity gNB PDCP 284 may communicate using the services provided respectively by UE RLC 268 and 5GNB RLC 286. According to some embodiments, UE RRC 264 and gNB RRC 282 may communicate using the services provided respectively by UE PDCP 266 and gNB PDCP 284. According to some embodiments, UE NAS 262 and AMF NAS 292 may communicate using the services provided respectively by UE RRC 264 and gNB RRC 282.

Figure 3:
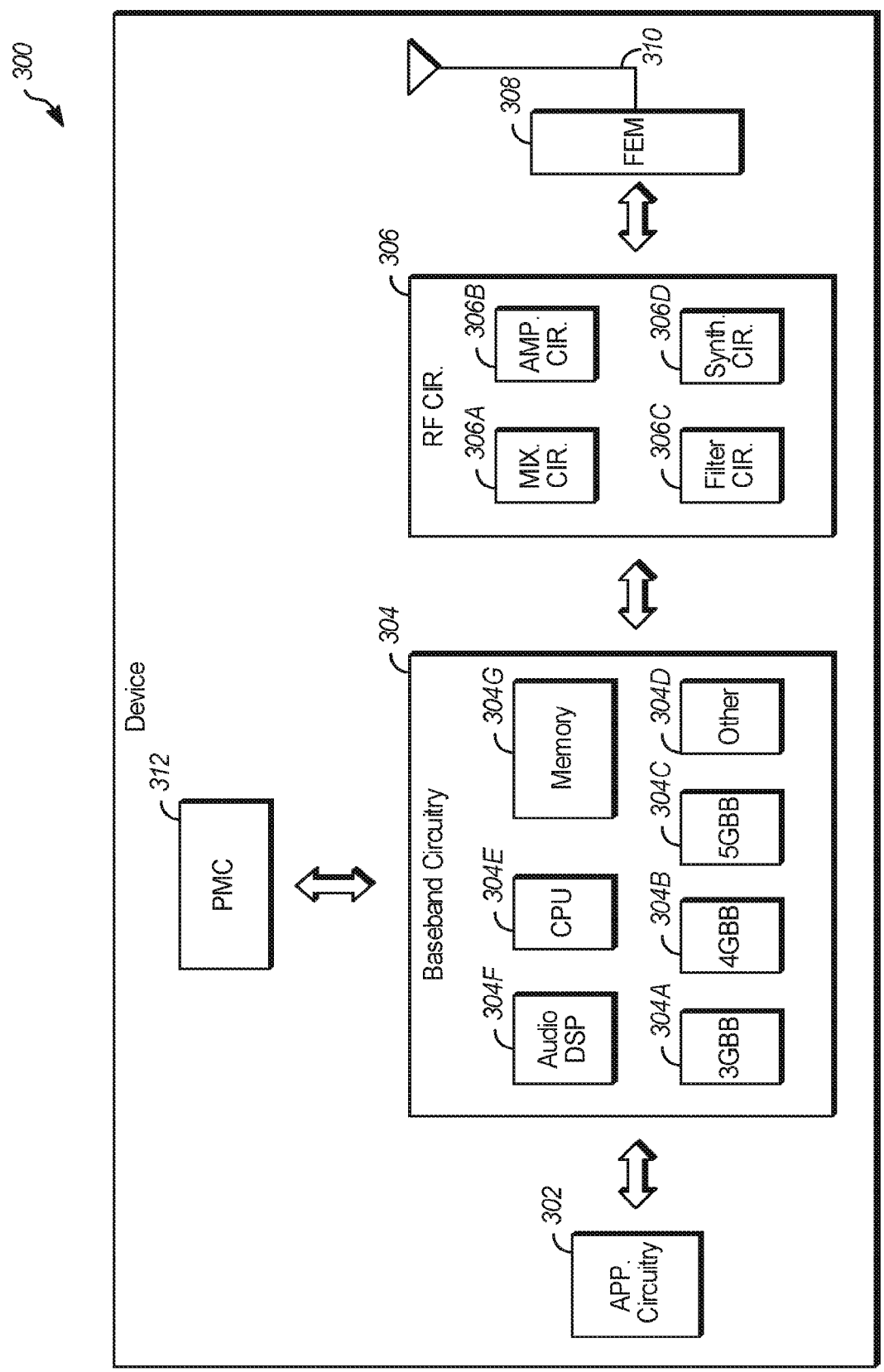
FIG. 3 illustrates example components of a device in accordance with some embodiments.

FIG. 3 illustrates example components of a device 300 in accordance with some embodiments. For example, the device 300 may be a device configured for preemption operations (e.g., UE 101, UE 102, UE 260, RAN Node 111/112). In some embodiments, the device 300 may include application circuitry 302, baseband circuitry 304, Radio Frequency (RF) circuitry 306, front-end module (FEM) circuitry 308, one or more antennas 310, and power management circuitry (PMC) 312 coupled together at least as shown. The components of the illustrated device 300 may be included in a UE (e.g., UE 101, UE 102, UE 260) or a RAN node (e.g., Macro RAN node 111, LP RAN node 112, gNB 280). In some embodiments, the device 300 may include less elements (e.g., a RAN node may not utilize application circuitry 302, and instead may include a processor/controller to process IP data received from an EPC). In some embodiments, the device 300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 302 may include one or more application processors. For example, the application circuitry 302 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 300. In some embodiments, processors of application circuitry 302 may process IP data packets received from an EPC.

The baseband circuitry 304 may include circuitry such as, but not limited to, one or more single-core or multi-core processors. The baseband circuitry 304 may include one or more baseband processors or control logic to process baseband signals received from a receive signal path of the RF circuitry 306 and to generate baseband signals for a transmit signal path of the RF circuitry 306. Baseband processing circuitry 304 may interface with the application circuitry 302 for generation and processing of the baseband signals and for controlling operations of the RF circuitry 306. For example, in some embodiments, the baseband circuitry 304 may include a third generation (3G) baseband processor 304A, a fourth generation (4G) baseband processor 304B, a fifth generation (5G) baseband processor 304C, or other baseband processor(s) 304D for other existing generations, generations in development or to be developed in the future (e.g., second generation (2G), sixth generation (6G), etc.).

The baseband circuitry 304 (e.g., one or more of baseband processors 304A-D) may handle various radio control functions that enable communication with one or more radio networks via the RF circuitry 306.

In other embodiments, some or all of the functionality of baseband processors 304A-D may be included in modules stored in the memory 304G and executed via a Central Processing Unit (CPU) 304E. The radio control functions may include, but are not limited to, signal modulation/demodulation, encoding/decoding, radio frequency shifting, etc. In some embodiments, modulation/demodulation circuitry of the baseband circuitry 304 may include Fast-Fourier Transform (FFT), precoding, or constellation mapping/demapping functionality. In some embodiments, encoding/decoding circuitry of the baseband circuitry 304 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 304 may include one or more audio digital signal processor(s) (DSP) 304F. The audio DSP(s) 304F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 304 and the application circuitry 302 may be implemented together such as, for example, on a system on a chip (SOC).

In some embodiments, the baseband circuitry 304 may provide for communication compatible with one or more radio technologies. For example, in some embodiments, the baseband circuitry 304 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 304 is configured to support radio communications of more than one wireless protocol may be referred to as multi-mode baseband circuitry.

RF circuitry 306 may enable communication with wireless networks using modulated electromagnetic radiation through a non-solid medium. In various embodiments, the RF circuitry 306 may include switches, filters, amplifiers, etc. to facilitate the communication with the wireless network. RF circuitry 306 may include a receive signal path which may include circuitry to down-convert RF signals received from the FEM circuitry 308 and provide baseband signals to the baseband circuitry 304. RF circuitry 306 may also include a transmit signal path which may include circuitry to up-convert baseband signals provided by the baseband circuitry 304 and provide RF output signals to the FEM circuitry 308 for transmission.

In some embodiments, the receive signal path of the RF circuitry 306 may include mixer circuitry 306A, amplifier circuitry 306B and filter circuitry 306C. In some embodiments, the transmit signal path of the RF circuitry 306 may include filter circuitry 306C and mixer circuitry 306A. RF circuitry 306 may also include synthesizer circuitry 306D for synthesizing a frequency for use by the mixer circuitry 306A of the receive signal path and the transmit signal path. In some embodiments, the mixer circuitry 306A of the receive signal path may be configured to down-convert RF signals received from the FEM circuitry 308 based on the synthesized frequency provided by synthesizer circuitry 306D. The amplifier circuitry 306B may be configured to amplify the down-converted signals and the filter circuitry 306C may be a low-pass filter (LPF) or band-pass filter (BPF) configured to remove unwanted signals from the down-converted signals to generate output baseband signals. Output baseband signals may be provided to the baseband circuitry 304 for further processing. In some embodiments, the output baseband signals may be zero-frequency baseband signals, although this is not a requirement. In some embodiments, mixer circuitry 306A of the receive signal path may comprise passive mixers, although the scope of the embodiments is not limited in this respect.

In some embodiments, the mixer circuitry 306A of the transmit signal path may be configured to up-convert input baseband signals based on the synthesized frequency provided by the synthesizer circuitry 306D to generate RF output signals for the FEM circuitry 308. The baseband signals may be provided by the baseband circuitry 304 and may be filtered by filter circuitry 306C. In some embodiments, the mixer circuitry 306A of the receive signal path and the mixer circuitry 306A of the transmit signal path may include two or more mixers and may be arranged for quadrature downconversion and upconversion, respectively. In some embodiments, the mixer circuitry 306A of the receive signal path and the mixer circuitry 306A of the transmit signal path may include two or more mixers and may be arranged for image rejection (e.g., Hartley image rejection). In some embodiments, the mixer circuitry 306A of the receive signal path and the mixer circuitry 306A may be arranged for direct downconversion and direct upconversion, respectively. In some embodiments, the mixer circuitry 306A of the receive signal path and the mixer circuitry 306A of the transmit signal path may be configured for superheterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 306 may include analog-to-digital converter (ADC) and digital-to-analog converter (DAC) circuitry and the baseband circuitry 304 may include a digital baseband interface to communicate with the RF circuitry 306. In some dual-mode embodiments, a separate radio IC circuitry may be provided for processing signals for each spectrum, although the scope of the embodiments is not limited in this respect.

In some embodiments, the synthesizer circuitry 306D may be a fractional-N synthesizer or a fractional N/N+1 synthesizer, although the scope of the embodiments is not limited in this respect as other types of frequency synthesizers may be suitable. For example, synthesizer circuitry 306D may be a delta-sigma synthesizer, a frequency multiplier, or a synthesizer comprising a phase-locked loop with a frequency divider. The synthesizer circuitry 306D may be configured to synthesize an output frequency for use by the mixer circuitry 306A of the RF circuitry 306 based on a frequency input and a divider control input. In some embodiments, the synthesizer circuitry 306D may be a fractional N/N+1 synthesizer.

In some embodiments, frequency input may be provided by a voltage controlled oscillator (VCO), although that is not a requirement. Divider control input may be provided by either the baseband circuitry 304 or the applications processor 302 depending on the desired output frequency. In some embodiments, a divider control input (e.g., N) may be determined from a look-up table based on a channel indicated by the applications processor 302. Synthesizer circuitry 306D of the RF circuitry 306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 306D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 306 may include an IQ/polar converter.

FEM circuitry 308 may include a receive signal path which may include circuitry configured to operate on RF signals received from one or more antennas 310, amplify the received signals and provide the amplified versions of the received signals to the RF circuitry 306 for further processing. FEM circuitry 308 may also include a transmit signal path which may include circuitry configured to amplify signals for transmission provided by the RF circuitry 306 for transmission by one or more of the one or more antennas 310. In various embodiments, the amplification through the transmit or receive signal paths may be done solely in the RF circuitry 306, solely in the FEM 308, or in both the RF circuitry 306 and the FEM 308.

In some embodiments, the FEM circuitry 308 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 306). The transmit signal path of the FEM circuitry 308 may include a power amplifier (PA) to amplify input RF signals (e.g., provided by RF circuitry 306), and one or more filters to generate RF signals for subsequent transmission (e.g., by one or more of the one or more antennas 310).

In some embodiments, the PMC 312 may manage power provided to the baseband circuitry 304. In particular, the PMC 312 may control power-source selection, voltage scaling, battery charging, or DC-to-DC conversion. The PMC 312 may often be included when the device 300 is capable of being powered by a battery, for example, when the device is included in a UE. The PMC 312 may increase the power conversion efficiency while providing desirable implementation size and heat dissipation characteristics.

While FIG. 3 shows the PMC 312 coupled only with the baseband circuitry 304. However, in other embodiments, the PMC 312 may be additionally or alternatively coupled with, and perform similar power management operations for, other components such as, but not limited to, application circuitry 302, RF circuitry 306, or FEM 308.

In some embodiments, the PMC 312 may control, or otherwise be part of, various power saving mechanisms of the device 300. For example, if the device 300 is in an RRC_Connected state, where it is still connected to the RAN node as it expects to receive traffic shortly, then it may enter a state known as Discontinuous Reception Mode (DRX) after a period of inactivity. During this state, the device 300 may power down for brief intervals of time and thus save power.

If there is no data traffic activity for an extended period of time, then the device 300 may transition off to an RRC_Idle state, where it disconnects from the network and does not perform operations such as channel quality feedback, handover, etc. The device 300 goes into a very low power state and it performs paging where again it periodically wakes up to listen to the network and then powers down again. The device 300 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 302 and processors of the baseband circuitry 304 may be used to execute elements of one or more instances of a protocol stack (e.g., protocol stack described with respect to FIG. 2A and FIG. 2B). For example, processors of the baseband circuitry 304, alone or in combination, may be used to execute Layer 3, Layer 2, or Layer 1 functionality, while processors of the application circuitry 304 may utilize data (e.g., packet data) received from these layers and further execute Layer 4 functionality (e.g., transmission communication protocol (TCP) and user datagram protocol (UDP) layers). As referred to herein, Layer 3 may comprise a RRC layer (e.g., 255, 264, 282). As referred to herein, Layer 2 may comprise a MAC layer (e.g., 220, 270, 288), a RLC layer (e.g., 230, 268, 286), and a PDCP layer (e.g., 240, 266, 284). As referred to herein, Layer 1 may comprise a PHY layer (e.g., 210, 272, 290) of a UE/RAN node.

Figure 4:
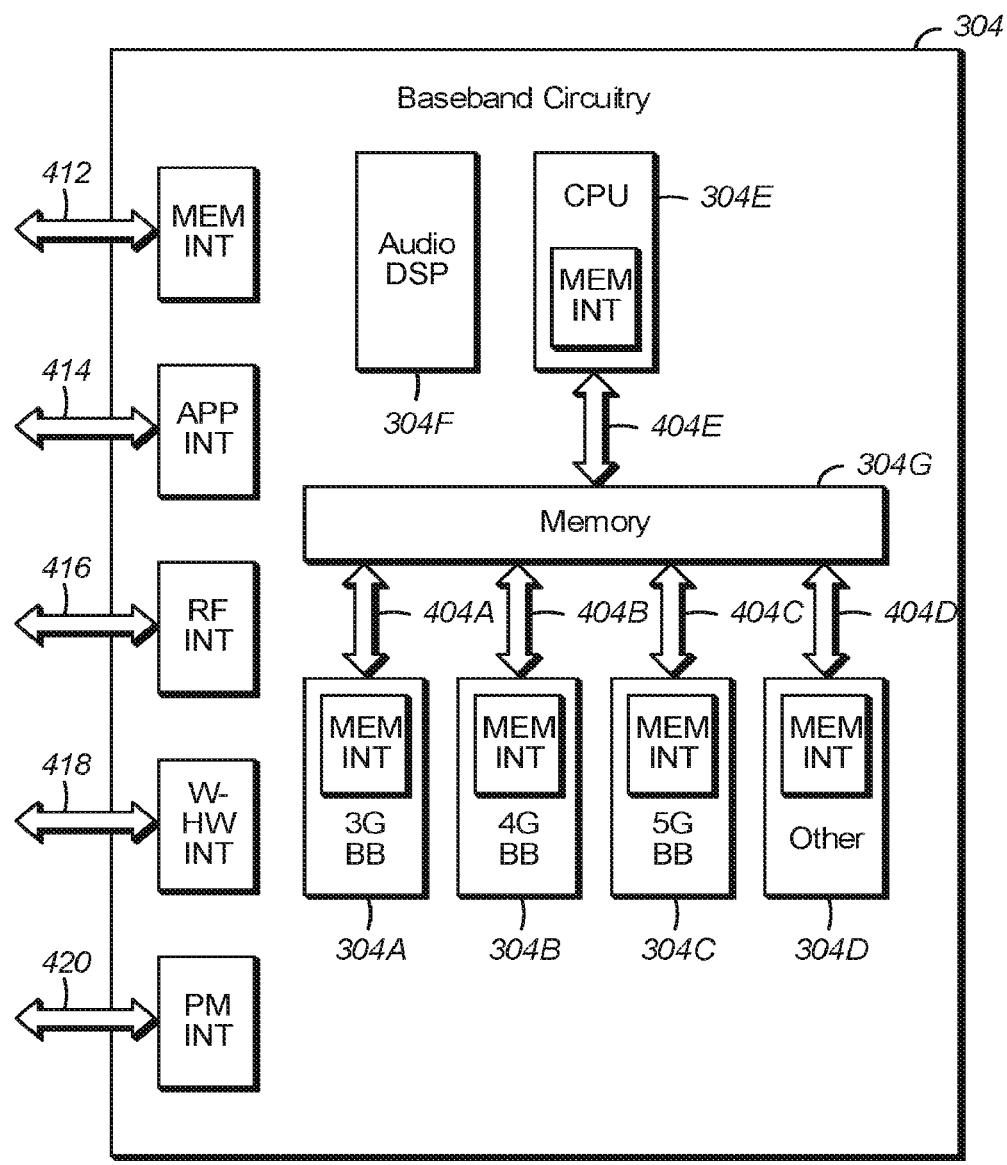
FIG. 4 illustrates example interfaces of baseband circuitry in accordance with some embodiments.

FIG. 4 illustrates example interfaces of baseband circuitry in accordance with some embodiments. As discussed above, the baseband circuitry 304 of FIG. 3 may comprise processors 304A-304E and a memory 304G utilized by said processors. Each of the processors 304A-304E may include a memory interface, 404A-404E, respectively, to send/receive data to/from the memory 304G.

The baseband circuitry 304 may further include one or more interfaces to communicatively couple to other circuitries/devices, such as a memory interface 412 (e.g., an interface to send/receive data to/from memory external to the baseband circuitry 304), an application circuitry interface 414 (e.g., an interface to send/receive data to/from the application circuitry 302 of FIG. 3), an RF circuitry interface 416 (e.g., an interface to send/receive data to/from RF circuitry 306 of FIG. 3), a wireless hardware connectivity interface 418 (e.g., an interface to send/receive data to/from Near Field Communication (NFC) components, Bluetooth® components (e.g., Bluetooth® Low Energy), Wi-Fi® components, and other communication components), and a power management interface 420 (e.g., an interface to send/receive power or control signals to/from the PMC 312).

Figure 5:
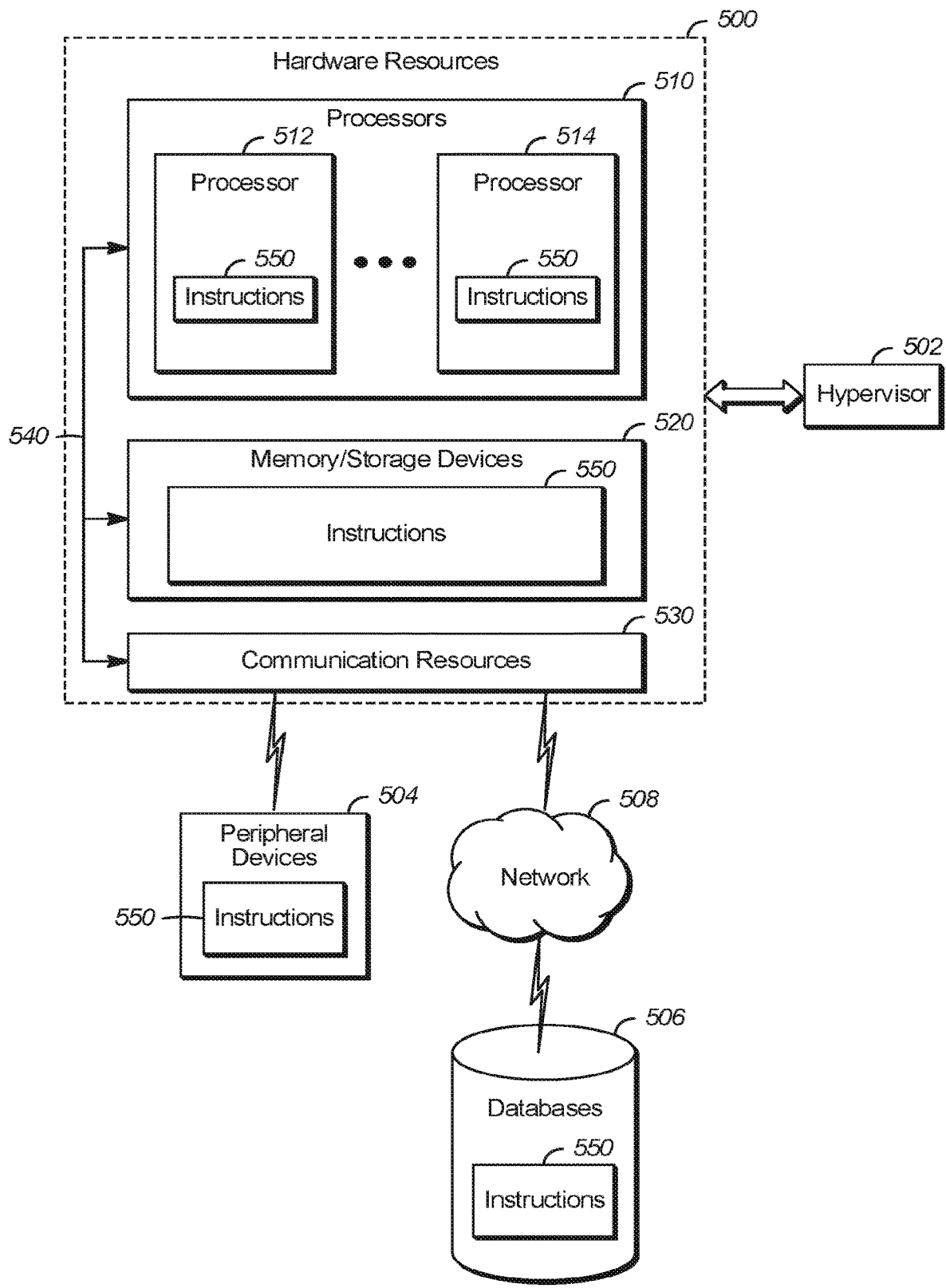
FIG. 5 is a block diagram illustrating components, according to some example embodiments, able to read instructions from a machine-readable or computer-readable medium.

FIG. 5 is a block diagram illustrating components, according to some example embodiments, able to read instructions from a machine-readable or computer-readable medium (e.g., a non-transitory machine-readable storage medium) and perform any one or more of the methodologies discussed herein, for example, one or more preemption operations. Specifically, FIG. 5 shows a diagrammatic representation of hardware resources 500 including one or more processors (or processor cores) 510, one or more memory/storage devices 520, and one or more communication resources 530, each of which may be communicatively coupled via a bus 540. For embodiments where node virtualization (e.g., NFV) is utilized, a hypervisor 502 may be executed to provide an execution environment for one or more network slices/sub-slices to utilize the hardware resources 500.

The processors 510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 512 and a processor 514.

The memory/storage devices 520 may include main memory, disk storage, or any suitable combination thereof. The memory/storage devices 520 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 530 may include interconnection or network interface components or other suitable devices to communicate with one or more peripheral devices 504 or one or more databases 506 via a network 508. For example, the communication resources 530 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 550 may comprise software, a program, an application, an applet, an app, or other executable code for causing at least any of the processors 510 to perform any one or more of the methodologies discussed herein. The instructions 550 may reside, completely or partially, within at least one of the processors 510 (e.g., within the processor's cache memory), the memory/storage devices 520, or any suitable combination thereof. Furthermore, any portion of the instructions 550 may be transferred to the hardware resources 500 from any combination of the peripheral devices 504 or the databases 506. Accordingly, the memory of processors 510, the memory/storage devices 520, the peripheral devices 504, and the databases 506 are examples of computer-readable and machine-readable media.

One approach to addressing the desire for efficient operation of both URLLC and eMBB services in one spectrum involves dynamic multiplexing. In some embodiments, to enable dynamic multiplexing, a gNB can be configured to preempt an ongoing eMBB transmission with a URLLC transmission (e.g., puncture resource elements already scheduled for eMBB transmissions with URLLC transmissions). In some embodiments, to assist a device such as a user equipment (UE) to perform proper soft combining of a corrupted initial transmission (e.g., initial eMBB transmission) and a retransmission (e.g., due to puncturing of eMBB data), the UE may be informed of certain time-frequency resources (e.g., including the eMBB) that are to be preempted (e.g., by a URLLC transmission) via a Preemption Indication (PI).

Figure 6:
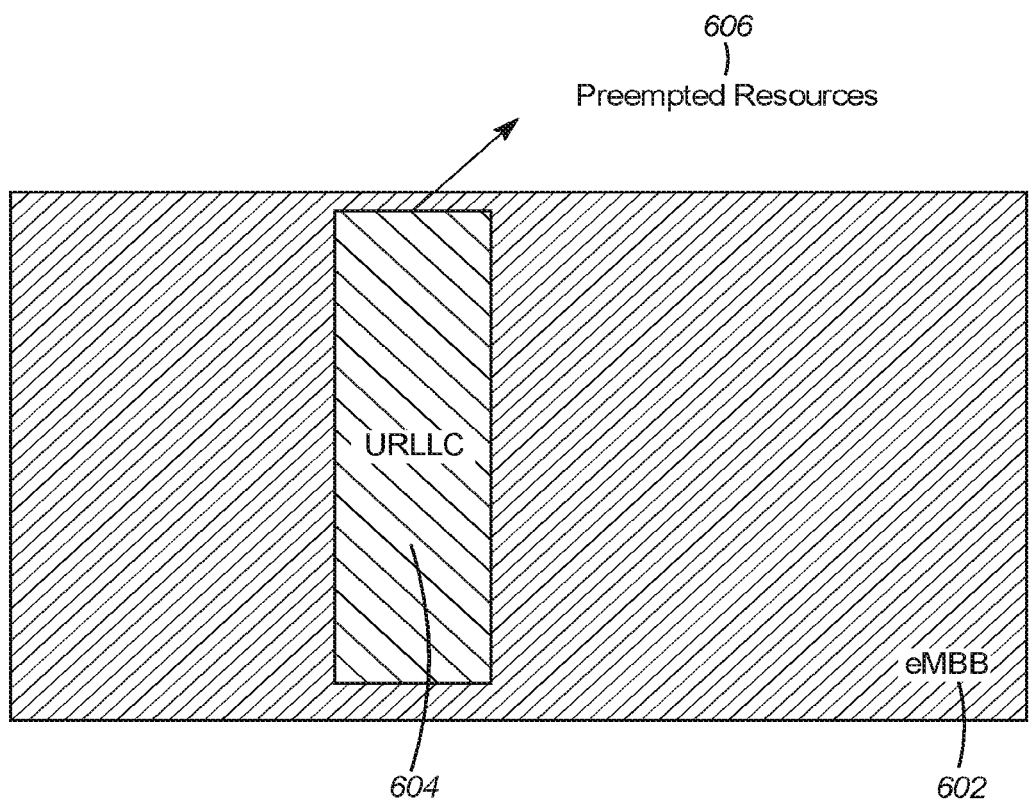
FIG. 6 illustrates an example of dynamic multiplexing of an eMBB transmission and an URLLC transmission, in accordance with certain embodiments.

FIG. 6 illustrates an example of dynamic multiplexing of an eMBB transmission and an URLLC transmission, in accordance with certain embodiments. In some embodiments, an access node, such as a gNB can preempt resources 606, within an eMBB transmission 602, for the transmission of a control channel and/or a data channel, for example, for an URLLC application (e.g., URLLC 604).

As will be described below in further detail, in some embodiments, an access node (e.g., gNB) can configure a device (e.g., UE) to monitor a region of time-frequency resources (e.g., reference downlink resources) for a PI. The gNB can configure the UE to monitor the region of time-frequency resources semi-statically, for example, by transmitting radio resource control (RRC) signaling that includes information to configure the UE with the region of time-frequency resources for monitoring. Embodiments are not limited to RRC signaling, however, as other embodiments include configuring the UE for monitoring the time-frequency region for a PI using various techniques. In some embodiments, the RRC signaling can include information (e.g., an information element (IE)) to configure the UE to monitor for a PI within a region of a system bandwidth, for example, within a bandwidth part (BWP). The RRC signaling can also include information to configure the UE to monitor for a PI within multiple BWPs and according to different BWP configurations, including different numerologies (e.g., numerologies defined in the 3GPP standard). In some embodiments, the gNB can encode a DCI format that is specific to (e.g., and includes information for) preemption indication (e.g., PI-DCI).

In certain embodiments, the DCI format may be used for notifying a group of UEs of a portion of physical resource blocks (PRBs) and symbols, such as Orthogonal Frequency Division Multiplexing (OFDM) symbols. A UE or multiple UEs may assume that, within the portion of the PRBs and OFDM symbols (e.g., a portion of PRBs and symbols of a PDSCH transmission), no transmission is intended for the respective UE receiving the DCI format. In certain embodiments, this means that some time-frequency resources (e.g., URLLC transmissions) are preempted (e.g., eMBB transmissions are preempted). To preempt eMBB transmissions, for example, a gNB can puncture resource elements that are scheduled for the eMBB transmissions, although embodiments are not so limited. In embodiments of a preempted transmission, a UE considers the preempted transmission (e.g., from the gNB) to be corrupted and can then perform soft combining of the corrupted (e.g., preempted) initial transmission and a retransmission (e.g., retransmission of an eMBB transmission). Receiving the PI from the gNB in such embodiments can assist with the soft combining.

As previously described, in certain embodiments, a UE can be configured to monitor for a PI within a BWP. A BWP part can be defined as a subset of a bandwidth of contiguous common resource blocks, according to a given numerology (p), on a given carrier. A BWP can also be defined by a starting position (e.g., starting resource block) and a number of resource blocks. In some embodiments, a maximum NR channel bandwidth may be 400 MHz and a gNB may configure one or multiple BWP configurations (e.g., for respective component carriers) within a wide system bandwidth for a given UE. For example, the gNB can semi-statically configure (e.g., transmit configuration information in RRC signaling to the UE) the BWP configurations. In some embodiments, the gNB can configure BWPs by encoding and transmitting to a UE information (e.g., IEs, higher-layer parameters) specific to a given numerology. Such information may also be transmitted in RRC signaling, and can include a reference numerology (e.g., for a BWP, for preempted resources), a frequency domain location for a given numerology, a bandwidth for a given numerology, and/or a subcarrier spacing of a BWP for a given numerology. According to some embodiments, the gNB can include such information in RRC signaling. The RRC signaling may also include information In some embodiments, a UE can be configured with up to four BWPs in a downlink (DL) and a single DL BWP may be active at a given time. In some embodiments, a UE can be configured with up to four BWPs in an uplink (UL) and a single UL BWP may be active at a given time. In some embodiments, for a given numerology and carrier, a resource grid of a number of subcarriers and a number of symbols (e.g., OFDM symbols) is defined, starting at a common resource block, which can be indicated by higher-layer signaling. A given numerology (e.g., for a given BWP) can have one of various subcarrier spacings and slot length configurations.

According to certain embodiments, the gNB can encode RRC signaling to include a radio network temporary identifier (RNTI) that is specific to preemption indication (e.g., PI-RNTI). The gNB can encode DCI (e.g., PI-DCI, DCI Format 2_1) with a cyclic redundancy check (CRC), that is scrambled (e.g., masked) by the RNTI (e.g, PI-RNTI), and the UE identifying the PI-RNTI can decode the PI-DCI to determine a PI and a location of preempted time-frequency resources. In some embodiments, a PI may be used for additional purposes, for example, to dynamically signal resources in UL. A gNB can achieve differentiation in UL by transmitting another RNTI for scrambling the DCI and reinterpreting the DCI format fields, assuming UL preemption, while keeping the same DCI size.

In some embodiments, the gNB can transmit DCI (e.g., PI-DCI) in a specific format (e.g., including the PI) via a PDCCH in a control-resource set (CORESET). A CORESET consists of a number of resource blocks in the frequency domain, which can be defined by a higher-layer parameter (e.g., in an IE), and a number of symbols (e.g., OFDM symbols) in the time domain, which can also be defined by a higher-layer parameter (e.g., in an IE). In some embodiments, an access node (e.g., gNB) can transmit the CORESET and associated defining parameters and/or IEs within RRC signaling to a UE to configure the UE for monitoring for PI-DCI (e.g., DCI format 2_1) and a PI within the CORESET.

Downlink control information transmitted in PDCCH is allocated to CCEs. A CCE consists of 6 resource-element groups (REGs), where a resource-element group equals one resource block during one OFDM symbol. REGs within a CORESET are numbered in increasing order in a time-first manner, starting with 0 for a first OFDM symbol and the lowest-numbered resource block in the control resource set. In some embodiments, a UE is configured (e.g., by a gNB) with multiple CORESETs, and each CORESET can be associated with one CCE-to-REG mapping.

Figure 7:
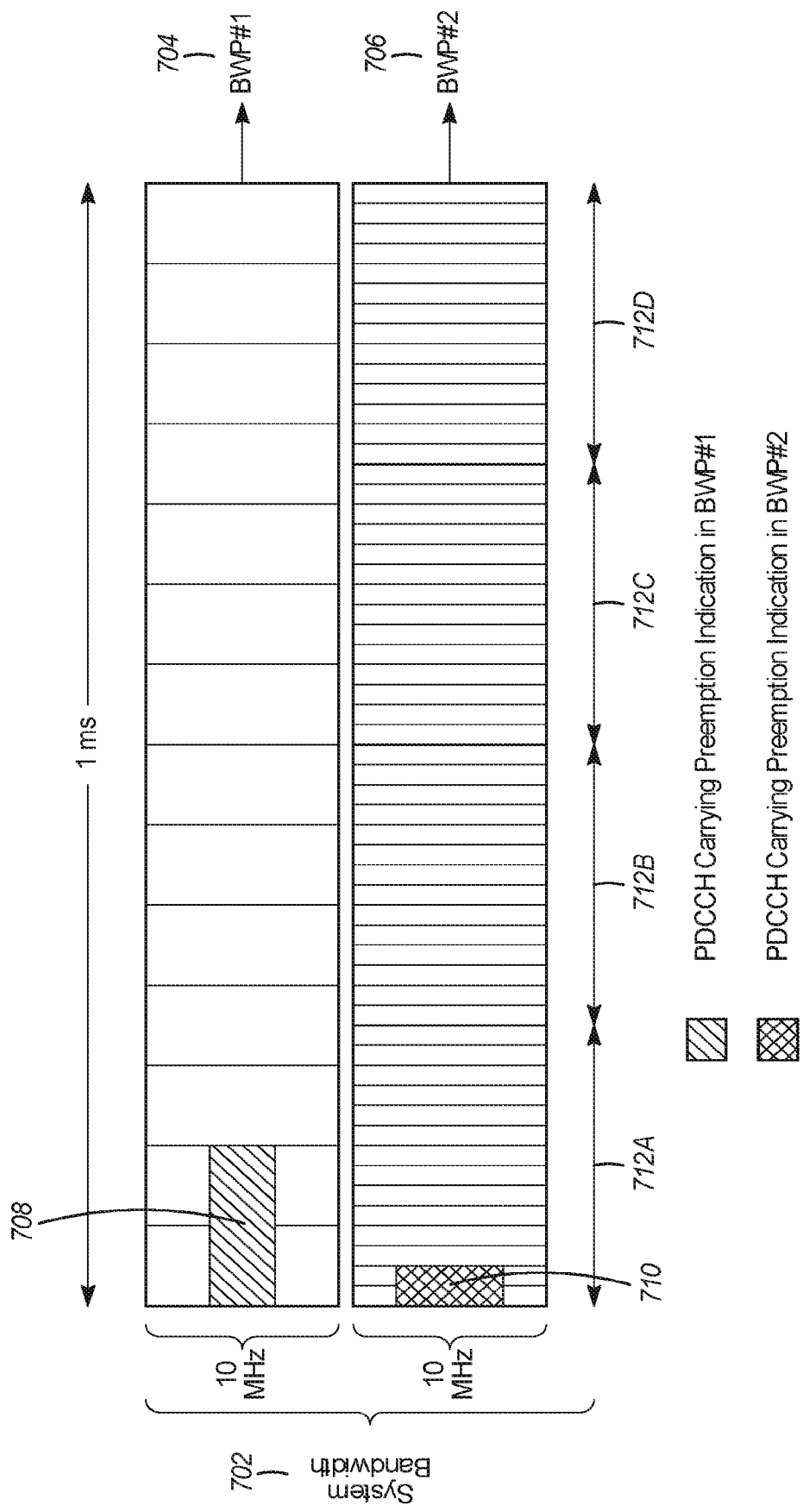
FIG. 7 illustrates an example of multiple bandwidth parts within a system bandwidth, in accordance with some embodiments.

FIG. 7 illustrates an example of multiple BWPs within a system bandwidth, in accordance with some embodiments. For example, the multiple BWPs of FIG. 7 can have different numerologies within a system bandwidth. In some embodiments, a system bandwidth 702 (e.g., wide system bandwidth) includes multiple BWPs, for example, BWP 704, BWP 706, and additional BWPs in some cases. In some embodiments, different BWPs (e.g., BWP 704, BWP 706) have different numerologies, including different subcarrier spacings and slot durations. A BWP configuration, according to its numerology, may have subcarrier spacing that is a scaled multiple (e.g., by a power of $2^n$, where n is an integer) of a 15 kHz subcarrier spacing.

In some embodiments, for example, in the case of wideband operation, a network device (e.g., gNB) can determine preempted time-frequency resources (e.g., for indication by PI in PI-DCI) in accordance with a numerology (e.g., reference numerology). A numerology for determination of preempted time-frequency resources may be any of a numerology used for the transmission of a synchronization block (SS block), a numerology predefined in a specification (e.g., 3GPP specification), a numerology configured for the CORESET used for transmission of PI-DCI (e.g., DCI format 2_1) in PDCCH, a numerology that is configured in a cell-specific manner for PI (e.g., via NR minimum system information (MSI), NR remaining minimum system information (RMSI), NR system information block (SIB)), or UE-specifically via UE-specific RRC signaling), and/or a numerology which is indicated within the PI. Further, frequency domain resources can be allocated based on a common physical resource block (PRB) indexing which can be employed for the wide system bandwidth operation.

In some embodiments, for example in FIG. 7, the BWP 704 is configured with a 15 kHz subcarrier spacing and a slot duration of 1 ms, while BWP 706 is configured with a 60 kHz subcarrier spacing and a slot duration of roughly 0.25 ms (e.g., 712A-712D), wherein for BWP 704 and BWP 706, the number of OFDM symbols within a slot is 14. In other embodiments, the system bandwidth 702 may include additional BWPs of different numerologies. For NR systems, symbol level alignment across different subcarrier spacings with a same cyclic prefix (CP) overhead may be assumed within a subframe duration in a NR carrier.

In some embodiments, a network node (e.g., gNB) can transmit a PI in DCI (e.g., PI-DCI, DCI format 2_1) within the CORESET to a group of UEs or in a cell-specific manner. The CORESET may be a shared and/or common CORESET and can be the same as a CORESET for PDCCH monitoring for scheduling, for example, for scheduling of remaining system information (RMSI) or paging or random access response (RAR). In certain embodiments, when the CORESET is different from a CORESET for PDCCH monitoring of common control messages, the CORESET configuration, including a time-frequency resource transmission scheme (e.g., interleaved or non-interleaved), resource element group (REG)-to-control channel element (CCE) mapping, monitoring periodicity, and numerology, can be configured by higher-layers via NR MSI, NR RMSI, NR SIB and/or UE-specific RRC signaling.

In time domain, according to a monitoring configuration in some embodiments, a UE may not monitor certain slots for the PDCCH carrying PI. In such cases, the gNB may not transmit the PI in an affected slot or an immediately adjacent slot to the affected slot. In some embodiments, an additional field (e.g., included in the PI) can be used to indicate a number of slots prior to the slot carrying the PI that a preemption occurs. For example, a number of slots between a portion of PRBs and OFDM symbols that omit transmissions intended for a UE and a slot that includes the PI. On the other hand, a UE receiving a PI significantly after an actual preemption event can cause reprocessing of a received PDSCH to be difficult or resource-intensive for a UE. In some embodiments, an upper bound, $N_s^{max}$, can be specified that indicates how much later in time (e.g., a number of slots) that the PI may be transmitted after the actual preemption event. In one embodiment, a maximum number of slots that may be indicated as part of the PI is the same as the upper bound, $N_s^{max}$. Alternatively, $N_s^{max}$ may be defined as part of a UE capability, and if a UE detects a PI indicating preemption more than $N_s^{max}$ slots before the PI where $N_s^{max}$ is reported by the UE, it is not required to reprocess the PDSCH taking into consideration the PI.

In some embodiments, a UE may be configured to disregard a PI that is received after a scheduled retransmission, for example, for a scheduled retransmission of an affected PDSCH (e.g., a retransmission of a PDSCH transmission that was preempted and considered corrupted by the UE). In some cases, a UE may have already soft-combined an earlier received copy of a transmission in PDSCH (e.g., without removing the corrupted soft-bits) with the retransmitted PDSCH. In some embodiments, a gNB can encode one or more PIs for transmission in multiple PDCCHs within one carrier bandwidth. For example, with respect to FIG. 7, a gNB may encode a PI for transmission in the PDCCH 708 of BWP 704 and a PI for transmission in the PDCCH 710 of BWP 706. Additionally, a gNB can encode each PDCCH (e.g., including PI) to be transmitted in a single BWP and can encode a PI to indicate preemption in a BWP other than the BWP in which it is transmitted. Because multiple bandwidth parts can be configured within a wider carrier bandwidth, where each BWP may be associated with a numerology, the CORESET configured for PDCCH carrying PI may be configured (e.g., gNB) using the numerology in the corresponding bandwidth part.

In some embodiments, the gNB can indicate multiple preemptions of time-frequency resources by encoding a parameter (e.g., granularity parameter, bitmap parameter, indication granularity). The granularity parameter can be transmitted explicitly in signaling (e.g., RRC signaling), transmitted in DCI (e.g., PI-DCI, DCI format 2_1), or can be derived by a UE implicitly. In some embodiments, the granularity parameter can specify a frequency granularity of preempted resources (e.g., preempted eMBB), which can be configured to be a number of elements (e.g., PRBs) within a monitoring region of time-frequency resources, according to a given numerology. The granularity parameter can also specify a time granularity of preempted resources (e.g., preempted eMBB), which can be configured to be a number of symbols within a monitoring region of time-frequency resources, also according to the given numerology. In certain embodiments, a gNB, in determining the granularity of the preempted resources, can consider a payload size of a group common DCI (e.g., PI-DCI, DCI format 2_1) carrying the PI.

In some embodiments, configuration of frequency regions smaller than a UE bandwidth can lead to scheduling restrictions and overdesigned signaling. To address this, the gNB can encode signaling so that the frequency region is implicitly indicated as a bandwidth of a BWP or a component carrier (CC) where a UE operates. For example, the BWP in which the CORESET is transmitted can be considered by the UE to be the bandwidth in which the UE monitors for the PI. In some embodiments, the gNB can transmit an indication to the UE in signaling to notify the UE of the bandwidth for monitoring being equal to the BWP. In other embodiments, additional start-RB and end-RB may be configured via RRC for the concerned BWP in order to further restrict the monitoring region (e.g., in case the puncturing/preemption is expected to affect only a portion of the BWP). With respect to time domain resources, configurability may be directly linked with a PI-DCI monitoring configuration. For example, a monitoring periodicity (e.g., 'p') can be reused as a monitoring region for monitoring for the PI.

In some cases, a UE may not benefit from receiving a PI that indicates a slot earlier than 'n-c' because of processing latency. If 'c' is smaller than a configured monitoring periodicity, the reference resource can be adjusted accordingly based on processing capabilities of all UEs in the group. To resolve the issue of UE processing time in relation to PI monitoring periodicity and in relation to the region of time-domain resources for PI, several techniques may be used.

In one embodiment, if a UE receives a PI in a slot or symbol 'n' indicating a preemption occurrence affecting a PDSCH for which it also received a PDSCH retransmission before slot/symbol 'n' the UE is not expected to consider the PI. For example, the UE is not expected to consider the PI for determination of acknowledgement and/or non-acknowledgement feedback corresponding to a PDSCH transmission. In some embodiments, PI targets avoiding soft-combining of corrupted log-likelihood ratios (LLR) from an affected (e.g., corrupted) PDSCH with a clean retransmitted copy. In case a hybrid automatic repeat request (HARQ) timing is relaxed, in some cases, whether to consider the PI may be left up to UE implementation. In some embodiments, however, the UE is expected to consider the PI for any HARQ combining of an affected or corrupted PDSCH with the retransmission of the affected transmission block (TB).

In some embodiments, to avoid additional buffering and associated increased power and memory (e.g., buffer) requirements, it is desirable for a UE to be aware of a PI before receiving a retransmission of PDSCH. Without being aware of the PI before receiving such retransmission, in some cases, the UE is likely to have already soft-combined an original PDSCH and a retransmitted version of the PDSCH. In some embodiments, a processing time t_reproc may be introduced for a PI. For example, a processing time may include a time between receiving a PI and transmitting an acknowledgement or non-acknowledgement. In certain embodiments, if UE receives a second PI after a first PI, and the time between the first PI and HARQ acknowledgement or non-acknowledgement (ACK/NACK) feedback is less than a time t_reproc, the UE may then be expected to consider the second PI.

In some embodiments, if a time gap between reception of a PI and HARQ ACK/NACK feedback is less than a time t_reproc, the UE is not expected to consider a PI for determining the ACK/NACK corresponding to the PDSCH indicated as being affected by preemption (e.g., indicated in PI-DCI as preempted). In some embodiments, t_reproc is equal to a minimum UE processing time (e.g., N1 symbols), for example, processing time for the PDSCH. In other embodiments, t_reproc may be less than N1, but is at least greater than f*N1, where 'f' is a predefined fraction. Processing time, t_reproc, can also be indicated by a UE as part of UE capability, and may also be configured by the network per UE based on UE capability for minimum UE processing time (e.g., if UE capability is defined for minimum UE processing time). In some embodiments, the UE is not expected to consider a PI corresponding to a TB for which it already received a retransmission during a time-gap between an affected PDSCH and the next PI monitoring instance (e.g., monitoring for PI-DCI).

In some embodiments, a transmitted SS block may have a higher priority than other physical channels and/or signaling. For example, in some embodiments, a gNB is configured to refrain from preempting time-frequency resources that would overlap with transmitted SS blocks. Alternatively, preempted time-frequency resources (e.g., time-frequency resources indicated by PI) can overlap with time-frequency resources of transmitted SS blocks. However, in such cases, the data and control channels transmitting within the preempted physical resource should be rate-matched around and/or puncture resources of the transmitted SS blocks.

In certain embodiments, when a UE is configured to monitor for both an eMBB and URLLC transmission, the UE may receive a DL control channel (e.g., PDCCH) and/or DL shared channel (e.g., PDSCH) for a URLLC within time-frequency resources (e.g., resources indicated by the PI). In such embodiments, the CORESET for PDCCH monitoring or the scheduled data will have higher priority than the preempted time-frequency resources (e.g., indicated by the PI) if the CORESET or scheduled data overlaps with the preempted time-frequency resources. In some embodiments, if a PI indicates the PDCCH and/or PDSCH for URLLC as being preempted, the UE will not assume that these resources are corrupted for a receive processing adjustment.

UE behavior, for such embodiments, may be configurable by higher-layer signaling. For this purpose, a bit indication (e.g., one bit) may be conveyed (e.g., transmitted by the gNB) as part of signaling for configuration of UE monitoring of a BWP and the CORESET (e.g., including PI-DCI) within the PDCCH (e.g., associated with a certain PDCCH search space to be used for scheduling of particular services). For example, the bit indication may be set to '1' to indicate to the UE that when scheduled via DCI (e.g., PI-DCI) in the CORESET, or PDCCH search space, the resources corresponding to the scheduled PDSCH cannot be preempted and thus should be excluded from calculation of corrupted resource elements (e.g., preempted resource elements) indicated by PI. In certain embodiments, the resources corresponding to transmission of PDCCH in the indicated CORESETs and resources corresponding to PDSCH scheduled using DCI in such CORESETs are reserved from being preempted, which can lead to restrictions to scheduling flexibility.

A dynamic signaling approach can be used, in some embodiments, including signaling to indicate whether the current PDSCH assignment may be preempted. For example, an access node (e.g., gNB) can encode a DCI bit indicating '0' to notify another node (e.g., UE) that the PDSCH may be subject to pre-emption. Additionally, the gNB can encode a DCI bit with a '1' to notify the UE that the scheduled PDSCH is not subject to preemption, even if a part of the corresponding physical resources are indicated as being preempted via the subsequent preemption indication signaling.

In another embodiment, when preempted time-frequency resources partially or fully overlap with reference signaling, certain UE behaviors may be defined (e.g., gNB defines UE behavior in encoded PI). For example, when preempted time-frequency resources partially or fully overlap the with demodulation-reference signals (DM-RS), the UE may need to flush a soft-bit buffer. For instance, the UE may not perform soft-bit combining between a partially preempted transmission and retransmission and/or initial transmission.

Figure 8A:
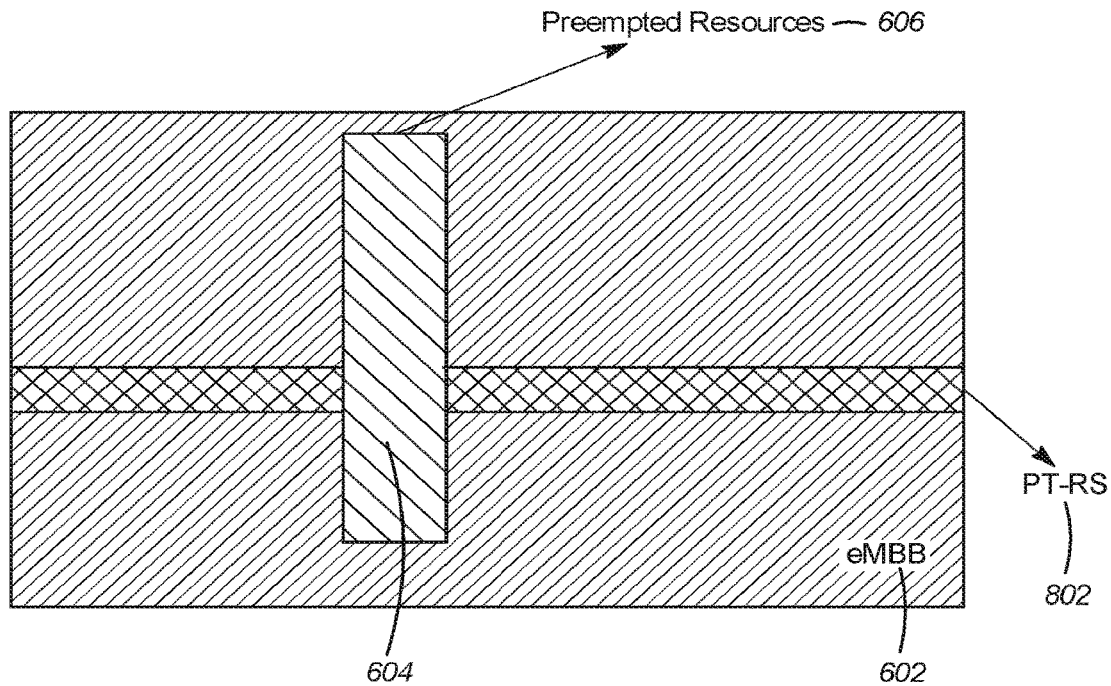
FIG. 8A illustrates an example of preempted time-frequency resources overlapping with a phase tracking-reference signal, in accordance with certain embodiments.

FIG. 8A illustrates an example of preempted resource overlapping with a phase tracking-reference signal (PT-RS), in accordance with certain embodiments. In embodiments when preempted time-frequency resources (e.g., preempted resources 606) partially or fully overlap with a PT-RS 802, for example, if a PT-RS 802 is transmitted in the same subcarrier across different symbols within a slot, the UE may need to flush a soft-bit buffer for the code blocks corresponding to physical resources following the preempted time-frequency resources (e.g., physical resources in time). In some embodiments, the time-frequency resources of FIG. 8A may include an eMBB transmission 602. In certain embodiments, soft-bits may not be reliable, as PT-RS 802 is corrupted after the preempted physical resources and the subsequent phase offset tracking performance cannot be guaranteed.

In another embodiment, physical resources configured for PT-RS transmissions may not be permitted to be preempted and may therefore be prioritized over URLLC transmissions and/or lower-latency transmissions. In such embodiments, the time-frequency resources indicated by the PI may not be permitted to overlap with the PT-RS resources. Alternatively, the time-frequency resources for preemption may be rate-matched around the PT-RS resources in case of partial overlap with PT-RS resources.

Figure 8B:
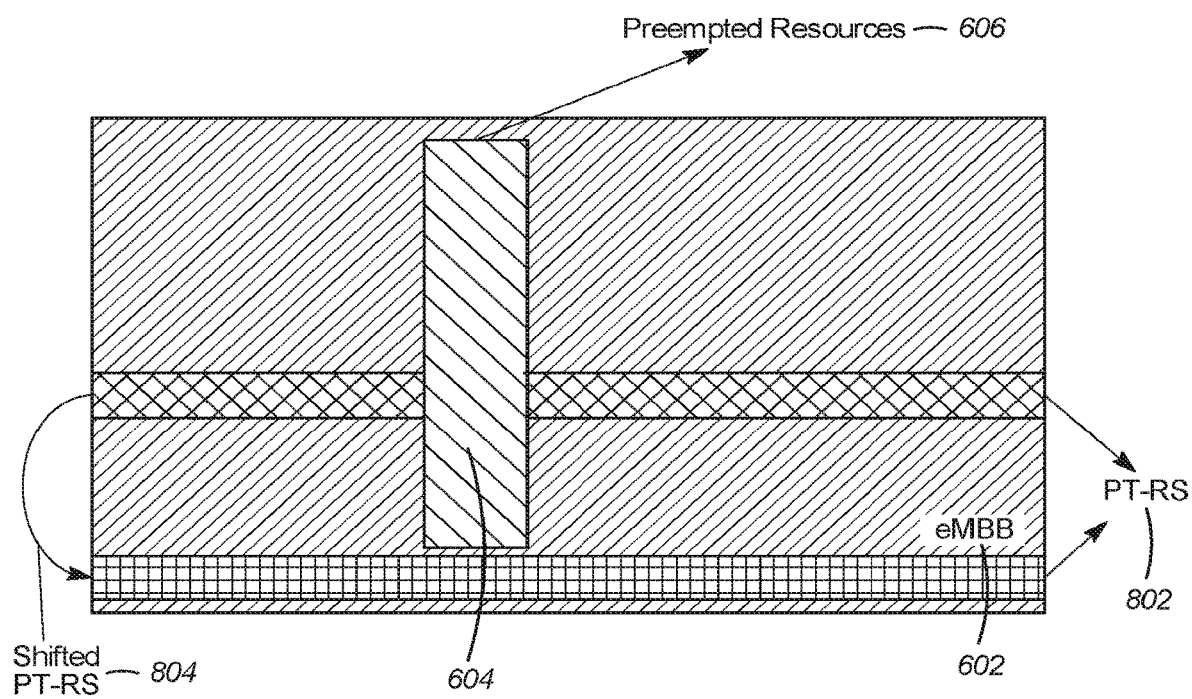
FIG. 8B illustrates an example of preempted time-frequency resources and a shifted phase tracking-reference signal, in accordance with certain embodiments.

Alternatively, in some embodiments, the PT-RS may be shifted to other time-frequency resources without collision. FIG. 8B illustrates an example of a shifted PT-RS, in accordance with certain embodiments. New subcarriers for PT-RS 802, for example, the shifted time-frequency resources for PT-RS 804, can be determined by the bandwidth of preempted resources and can be configured by higher-layer signaling and/or DCI (e.g., PI-DCI). Whether the PT-RS should be punctured or shifted can be pre-defined and/or configured by higher-layer signaling and/or DCI. Additionally, whether the PT-RS should be punctured can be determined by any one or more of a subcarrier spacing p, an allocated bandwidth, a modulation and coding scheme (MCS), and/or a number of symbols for preempted resources. Further, for a slot, the dynamic presence of the PT-RS can be determined by the number of symbols for preempted resources in addition to subcarrier spacing u, allocated bandwidth, and MCS. In some embodiments, the time-frequency resources of FIG. 8B may include an eMBB transmission 602.

In some embodiments, when preempted time-frequency resources overlap with a channel state information reference signal (CSI-RS), the UE can be configured to skip processing measurement results for a CSI report. For example, the UE may refrain from performing filtering on a CSI measurement where a CSI-RS transmission is punctured by preempted resources. In another embodiment, the CSI-RS may be shifted to different symbols to avoid a collision, and the symbol offset can be pre-defined or configured by higher-layer signaling and/or DCI (e.g., PI-DCI). In some embodiments, the symbol offset may be determined by a symbol length of preempted resources.

A tracking reference signal (TRS) may be used for fine time/frequency offset tracking. In certain embodiments, when preempted time-frequency resources overlap (e.g., partially or fully overlap) with a TRS, an access node (e.g., gNB) may refrain from transmitting the TRS. Alternatively, the TRS can be shifted to different symbols to avoid a collision, and the symbol offset can be pre-defined, configured by higher-layer signaling and/or DCI (e.g., PI-DCI), or may be determined by a symbol length of preempted resources.

To indicate preempted resources, an access node (e.g., gNB) can encode the PI-DCI (e.g., PI), for transmission within the region of time-frequency resources for monitoring, to include various information for indicating preempted time-resources. In one embodiment, the PI-DCI (e.g., PI) can include a joint time-frequency bitmap. For example, the joint time-frequency bitmap may comprise a two-dimensional (2D) bitmap and/or matrix to indicate (e.g., encode) multiple preemptions within time-frequency resources (e.g., within an eMBB transmission). As a nonlimiting example, a NR slot can have 14 symbols, which may be divided into 7 symbol parts (e.g., 2 symbols per part), or 14 symbol parts (e.g., 1 symbol per part). In some embodiments, a bitmap can signal which portions of the NR slot (e.g., subframe) are preempted in the time-frequency resources.

In some embodiments, the y-axis of a time-frequency grid, representing frequency (e.g., bandwidth), can be configured to comprise ¾ of a BWP, and the x-axis of the time-frequency grid, representing time (e.g., symbols and slots of a subframe), can be configured to comprise 2 symbols with a 1 slot monitoring periodicity. In such embodiments, a bitmap may consume 4*7=28 bits. However, in certain applications that cover almost an entire bandwidth, such an approach may not be efficient, for example, for purposes of a distributed DL resource allocation for URLLC, where the distributed resource allocation can enable frequency diversity.

As a more flexible approach, an access node (e.g., gNB) can encode an additional bit field (e.g., a small 1-2 bit field in the PI-DCI). The bit field, for example, can serve as the granularity parameter and/or indication granularity, to switch time-frequency granularity (e.g., preemption granularity) dynamically. For example, if $y=g \cdot y_0$ and $x=x_0/g$, then the additional bit could switch between different values of g. In certain embodiments, different values of g may be semi-statically configured (e.g., configured by higher-layers, configured via RRC signaling) and in other embodiments, different values of g may be dynamically configured via DCI (e.g., PI-DCI, DCI format 2_1).

In certain embodiments, a granularity parameter (e.g., indication granularity) can indicate a granularity of preempted time-frequency resources through a mapping of a bitmap. For example, the granularity parameter can include a bit value indicating how many bits of a field in the preemption indication (e.g., PI, PI-DCI, DCI format 2_1) map to groups of symbols in preempted time-frequency resources (e.g., a portion of PRBs and OFDM symbols that are preempted, eMBB transmissions). In some embodiments, a granularity parameter including a value of 0 indicates that 14 bits of a field in the PI-DCI (e.g., DCI format 2_1) have a one-to-one mapping with 14 groups of consecutive symbols in preempted time-frequency resources. In other embodiments, a granularity parameter including a value of 1 indicates that 7 pairs of bits of a field in the PI-DCI (e.g., DCI format 2_1) have a one-to-one mapping with 7 groups of consecutive symbols in preempted time-frequency resources. Embodiments are not so limited however, as the granularity parameter can indicate other granularities of preempted time-frequency resources.

Figures 9A, 9B, 9C:
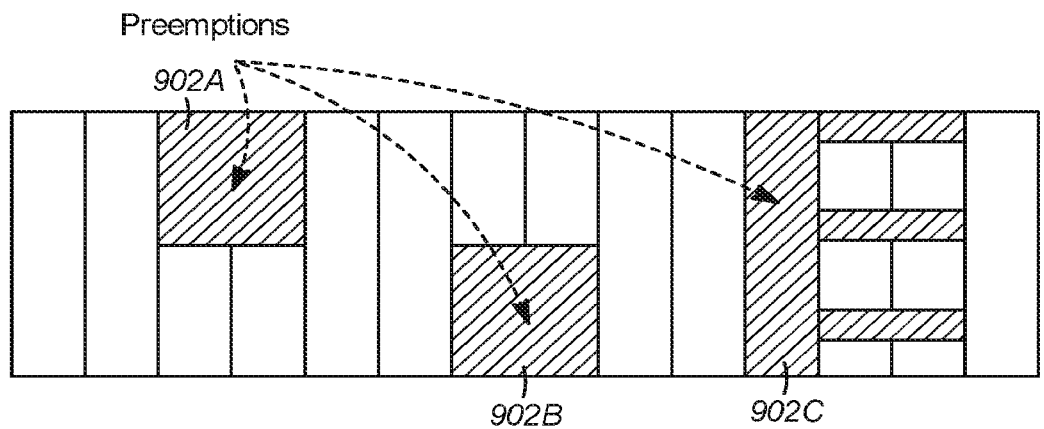
FIG. 9A illustrates an example of preempted time-frequency resources, in accordance with certain embodiments.
FIG. 9B illustrates an example of a bitmap for preemption of time-frequency resources, in accordance with certain embodiments.
FIG. 9C illustrates an alternative example of a bitmap for preemption of time-frequency resources, in accordance with certain embodiments.

FIG. 9A illustrates an example of preempted time-frequency resources, in accordance with certain embodiments. For example, time-frequency resources can be preempted in multiple portions 902A, 902B, and 902C, and a transmitted bitmap can indicate the multiple portions of preempted time-frequency resources (e.g., bitmap transmitted in PI and/or PI-DCI/DCI format 2_1).

FIG. 9B illustrates an example of a bitmap 904 for preemption of time-frequency resources, in accordance with certain embodiments. In some embodiments, the bitmap 904 can indicate a configurable time-frequency granularity, for example, a 4×7 time-frequency granularity. A 4×7 granularity can indicate 4 partitions in the frequency domain and 7 partitions in the time domain. FIG. 9C illustrates an alternative example of a bitmap 906 for preemption of time-frequency resources, in accordance with certain embodiments. In some embodiments, the bitmap 906 can indicate a configurable time-frequency granularity, for example, a 2×14 time-frequency granularity. A 2×14 granularity can indicate 2 partitions in the frequency domain and 14 partitions in the time domain.

In FIG. 9B and FIG. 9C, the bitmaps 904 and 906 can indicate and/or configure time-frequency granularities for preemption of resources (e.g., preemption of eMBB transmissions by URLLC). In other embodiments, bitmaps that include different values can indicate and/or configure different time-frequency granularities.

In certain embodiments, with respect to FIG. 9B and FIG. 9C, a bit value of 0 in one of bitmaps 904 or 906, or a different bitmap, can indicate no preemption of time-frequency resources. In such embodiments, indication of no preemption of time-frequency resources indicates a normal transmission (e.g., transmission of eMBB, transmission of signaling in PDSCH). In alternative embodiments, a bit value of 1 in one of bitmaps 904 or 906, or a different bitmap, can indicate a preemption of time-frequency resources. In such embodiments, indication of a preemption of time-frequency resources indicates that a transmission is not intended for a certain UE and/or corruption of signaling by the gNB. In some embodiments, a granularity value (e.g., bitmap and/or matrix indicating a granularity) can change dynamically, for example, the gNB may change bit values in a bitmap and indicate bit values through DCI (e.g., PI-DCI).

In certain embodiments, bitmaps (e.g., 904 and 906) to indicate and/or configure time-frequency granularities for preemption of resources can be semi-statically configured (e.g., configured by higher-layers, configured via RRC signaling) and in other embodiments, the bitmaps may be dynamically configured via DCI (e.g., PI-DCI, DCI format 2_1). Bitmaps can be configured to indicate and/or configure one of time granularity or frequency granularity, and based on receiving this information through signaling (e.g., from a gNB), a device (e.g., UE) can derive a time granularity from an indicated frequency granularity (e.g., indicated in a bitmap), or vice versa.

Figure 10A:
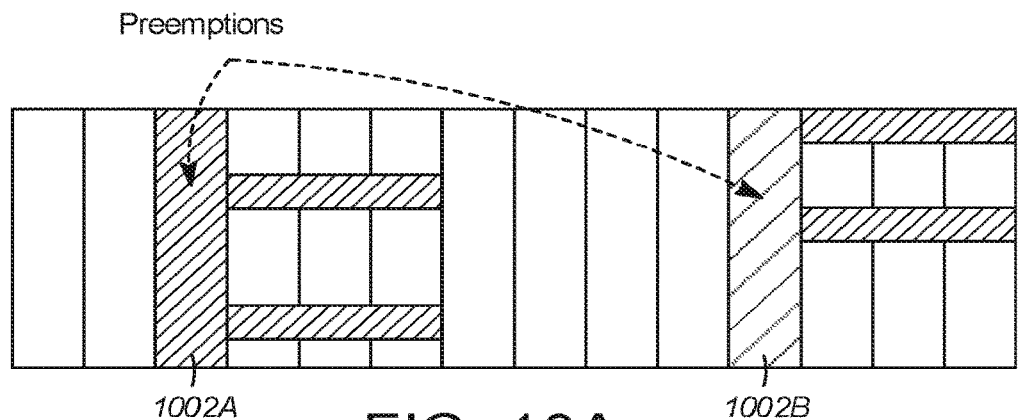
FIG. 10A illustrates an example of preempted time-frequency resources, in accordance with certain embodiments.

In other embodiments, a gNB can use a non-uniform bitmap density per time resource to better reflect mini-slot structures. For example, each 'm' occasion in a time bitmap can correspond to a single bit puncturing information without frequency resolution. Such an embodiment may be useful when the PDCCH for URLLC scheduling (e.g., and DMRS) is to span a whole bandwidth, (e.g., because of a high aggregation level) while the PDSCH is to be transmitted in distributed manner. FIG. 10A illustrates an example of preempted time-frequency resources, as indicated by a non-uniform bitmap, in accordance with certain embodiments. For example, time-frequency resources might be preempted in multiple portions 1002A and 1002B, and a transmitted non-uniform bitmap can indicate the multiple portions of preempted time-frequency resources (e.g., non-uniform bitmap transmitted in PI and/or PI-DCI/DCI format 2_1).

Figure 10B:
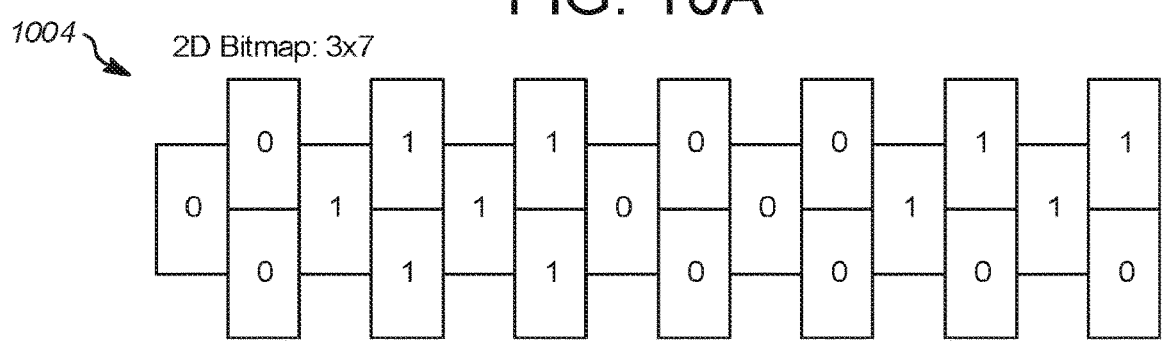
FIG. 10B illustrates an example of non-uniform bitmap, in accordance with certain embodiments.

FIG. 10B illustrates an example of non-uniform bitmap 1004, in accordance with certain embodiments. In some embodiments, bitmap 1004 can indicate and/or configure a non-uniform bitmap density per time resource, for example, to configure time-frequency granularities for preemption of resources 1002A and 1002B. In certain embodiments, the bitmap 1004 can be a 3×7 bitmap to indicate non-uniform 3 partitions in the frequency domain and 7 partitions in the time domain.

Figure 11:
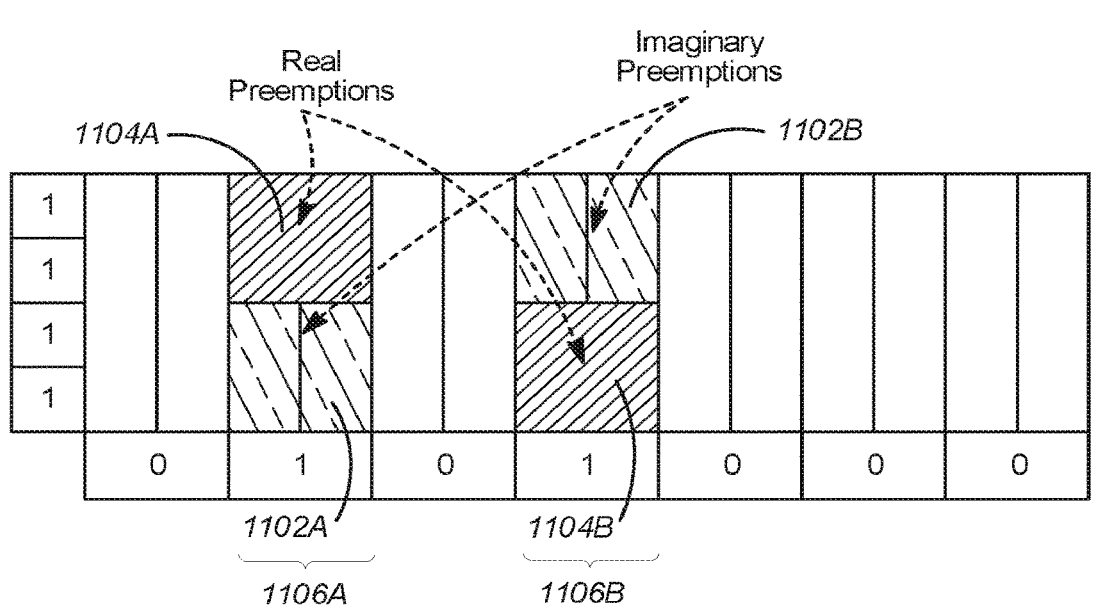
FIG. 11 illustrates an example of preemption indication signaling with separate time domain and frequency domain indications, in accordance with certain embodiments.

In some embodiments, an access node (e.g., gNB) can transmit signaling including time information (e.g., time indications) separately from frequency indications (e.g., separate time and frequency bitmaps). FIG. 11 illustrates an example of preemption indication signaling with separate time domain and frequency domain indications, in accordance with certain embodiments. For example, this approach can be advantageous when time information is considered to be more important than frequency information (e.g., in wideband URLLC puncturing and frequency-first RE mapping). Separate time and frequency bitmaps may result in a reduction in signaling size.

In embodiments that include separate time bitmaps and frequency bitmaps, however, some signaling ambiguity can occur (e.g., imaginary preemption). Imaginary preemptions 1102A and 1102B can include a portion of a preemption not occurring when separate time bitmap and frequency bitmap signaling is transmitted. Real preemptions 1104A and 1104B can include the portions of the preemptions that occur when the separate time bitmap and frequency bitmap signaling is transmitted.

In some cases, multiple preemptions might be signaled ambiguously and a receiving device (e.g., UE) may not know which portion of time-frequency resources are preempted by a first preemption occasion and/or which portion of time-frequency resources are preempted by a second preemption. For example, if a UE receives a frequency indication (e.g., indication by frequency bitmap), the UE may not know which portion of time-frequency resources are preempted by preemption 1106A and/or which portion of time-frequency resources are preempted by preemption 1106B. In such cases, a gNB may become aware of an occurrence of imaginary preemptions 1102A and 1102B by receiving a negative acknowledgement (NACK) in HARQ feedback, based on PDSCH processing.

In some embodiments, a gNB can avoid imaginary preemptions by signaling several frequency domain patterns as a vector of bitmaps, the frequency domain patterns corresponding to different preemptions. In some embodiments, a number of time domain preemptions are limited to less than a time domain preemption bitmap length to conserve signaling overhead. In certain embodiments, a UE can interpret a received frequency indication based on a number of is in a time bitmap. For example, the resolution of each frequency indication bitmap can be configured based on a number of time domain preemptions $$\text{num\_freq\_bit} = \text{floor}\left(\frac{D_f}{\text{sum(time\_bitmap)}}\right),$$

where $D_f$ is a number of bits for a frequency domain indication, time_bitmap is a time domain bitmap, and num_freq_bit is a bitmap size of each frequency domain indication.

In some embodiments, a gNB may configure a set of puncturing time-frequency patterns, for example, via transmission of semi-static signaling (e.g., RRC signaling) and/or DCI signaling (e.g., via configuration index). In one embodiment, a gNB can limit a number of signaled preemptions and use combinatorial indexing to optimize higher-layer signaling. If a number of preemptions is limited there are fewer combinations to signal. For example, referring to FIG. 9A and FIG. 10A, the number of preemptions may be limited to half of the resources or the 28 overall puncturing resources. Such optimizations may only introduce 1-2 bit savings unless a reduced number of preemptions can be signaled (e.g., 7 arbitrary preemptions in 28 resources require approximately 21 bit signaling).

In some embodiments, optimized signaling can be defined, while accounting for a maximum payload for indications (e.g., maximum DCI payload). In such embodiments, signaling can include one or more parameters including a number of bits available for indication of preemptions, D, reference time resource symbols, $R_t$, reference frequency resources (e.g., PRBs), $R_f$, time and frequency granularities 'x' and 'y,' respectively, a number of time resources within a region $N_t$=floor($R_t$/x), and a number of frequency resources within a region $N_f$=floor(R/y), where $D=N_f N_t$=floor(R/x)·floor(R/y). In some embodiments, knowing the overall size of an indication D, and one of a granularity of time or frequency, a UE can derive another granularity of one of time or frequency. In other embodiments, knowing D and $R_t$ and $R_f$, (e.g., from a DL resource configuration), the UE can derive a number of partitions in time and/or frequency. In such embodiments, either 'x' or 'y' can be signaled and the UE can derive the value of 'x' or 'y' that is not signaled from the signaled value, the overall available number of signaling bits, and the reference resource region size.

Figure 12:
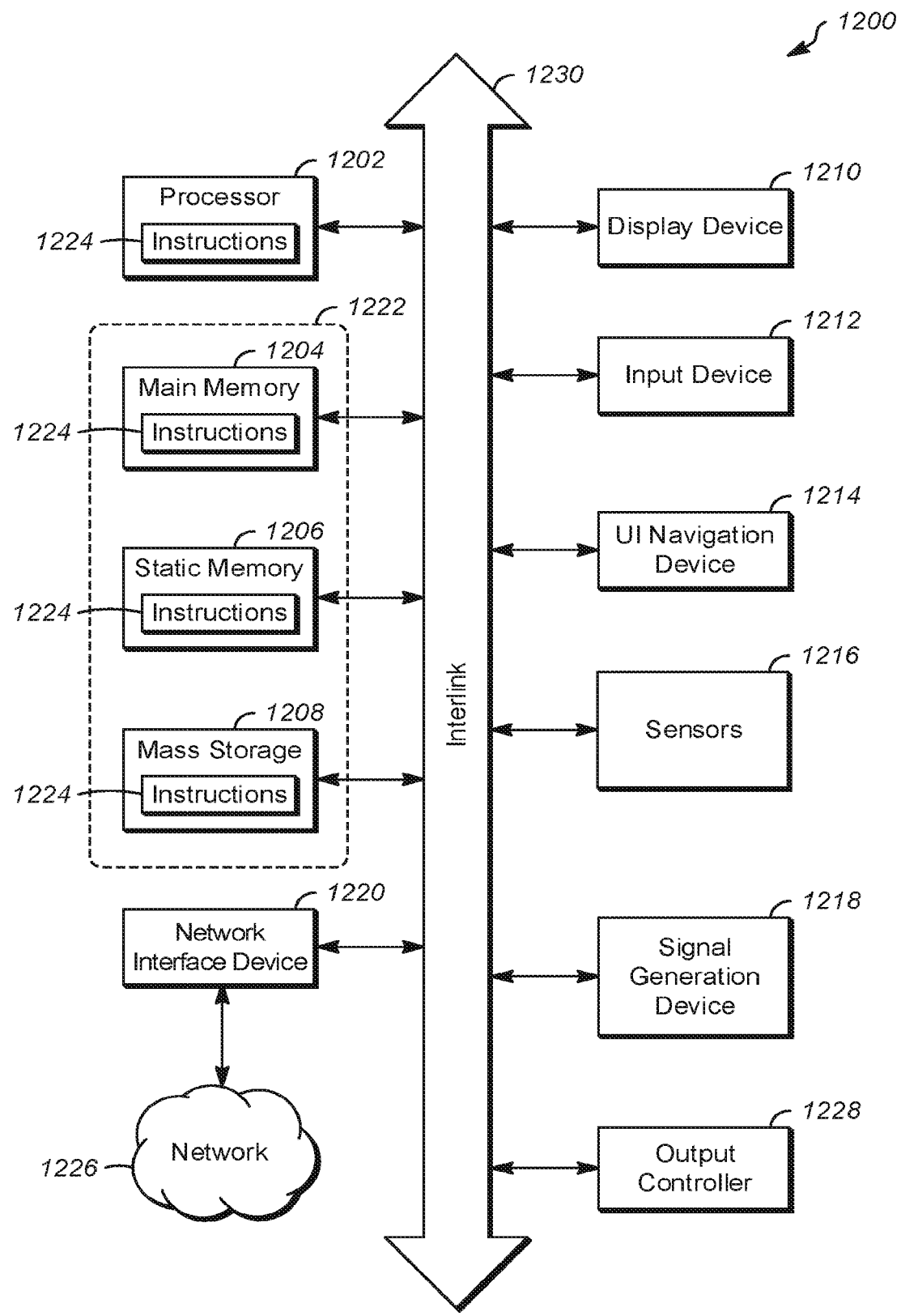
FIG. 12 illustrates a block diagram of an example machine, in accordance with some embodiments.

FIG. 12 illustrates a block diagram of an example machine 1200 upon which any one or more of the techniques (e.g., methodologies) discussed herein may be performed, for example, one or more preemption operations. Examples, as described herein, may include, or may operate by, logic or a number of components, or mechanisms in the machine 1200. Circuitry (e.g., processing circuitry) is a collection of circuits implemented in tangible entities of the machine 1200 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1200 follow.

In alternative embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environment. The machine 1200 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1200 may include a hardware processor 1202 (e.g., a central processing unit (CPU), a graphics processing unit (GPU), a hardware processor core, or any combination thereof), a main memory 1204, a static memory (e.g., memory or storage for firmware, microcode, a basic-input-output (BIOS), unified extensible firmware interface (UEFI), etc.) 1206, and mass storage 1208 (e.g., hard drive, tape drive, flash storage, or other block devices) some or all of which may communicate with each other via an interlink (e.g., bus) 1230. The machine 1200 may further include a display unit 1210, an alphanumeric input device 1212 (e.g., a keyboard), and a user interface (UI) navigation device 1214 (e.g., a mouse). In an example, the display unit 1210, input device 1212 and UI navigation device 1214 may be a touch screen display. The machine 1200 may additionally include a storage device (e.g., drive unit) 1208, a signal generation device 1218 (e.g., a speaker), a network interface device 1220, and one or more sensors 1216, such as a global positioning system (GPS) sensor, compass, accelerometer, or other sensor. The machine 1200 may include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1202, the main memory 1204, the static memory 1206, or the mass storage 1208 may be, or include, a machine readable medium 1222 on which is stored one or more sets of data structures or instructions 1224 (e.g., software) embodying or utilized by any one or more of the techniques or functions described herein. The instructions 1224 may also reside, completely or at least partially, within any of registers of the processor 1202, the main memory 1204, the static memory 1206, or the mass storage 1208 during execution thereof by the machine 1200. In an example, one or any combination of the hardware processor 1202, the main memory 1204, the static memory 1206, or the mass storage 1208 may constitute the machine readable media 1222. While the machine readable medium 1222 is illustrated as a single medium, the term "machine readable medium" may include a single medium or multiple media (e.g., a centralized or distributed database, and/or associated caches and servers) configured to store the one or more instructions 1224.

The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1224 may be further transmitted or received over a communications network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1220 may include one or more physical jacks (e.g., Ethernet, coaxial, or phone jacks) or one or more antennas to connect to the communications network 1226. In an example, the network interface device 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1200, and includes digital or analog communications signals or other intangible medium to facilitate communication of such software. A transmission medium is a machine readable medium.

EXAMPLES

Although an aspect has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "aspect" merely for convenience and without intending to voluntarily limit the scope of this application to any single aspect or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

The following describes various examples of methods, machine-readable media, and systems (e.g., machines, devices, or other apparatus) discussed herein.

Example 1 is an apparatus of a New Radio (NR) NodeB (gNB), the apparatus comprising: memory; and one or more processors configured to: encode radio resource control (RRC) signaling to configure a user equipment (UE) for monitoring a region of time-frequency resources for a preemption indication (PI), the RRC signaling including a bandwidth part (BWP) information element to configure a BWP of the region of time-frequency resources for transmission of preemption indication downlink control information (PI-DCI); encode, for transmission to a group of UEs including the UE, the PI-DCI to include the PI and to indicate a portion of physical resource blocks (PRBs) that omit transmissions intended for the UE; and configure transceiver circuitry to transmit the PI-DCI in a physical downlink control channel (PDCCH) in a control resource set (CORESET) to the group of UEs, and wherein the memory is configured to store the PI.

In Example 2, the subject matter of Example 1 includes, wherein the BWP information element includes a frequency domain location, a bandwidth, and a subcarrier spacing of the BWP for a given numerology.

In Example 3, the subject matter of Examples 1-2 includes, wherein the RRC signaling includes a preemption indication radio network temporary identifier (PI-RNTI) used for indicating pre-emption in a downlink (DL), and wherein the processing circuitry is configured to encode the PI-DCI with a cyclic redundancy check (CRC) scrambled by the PI-RNTI.

In Example 4, the subject matter of Examples 1-3 includes, wherein the region of time-frequency resources is defined by a starting position and a number of resource blocks within the BWP.

In Example 5, the subject matter of Examples 1-4 includes, wherein the PI-DCI includes a bit value of 0 to indicate a transmission in a corresponding symbol group, and wherein the PI-DCI includes a bit value of 1 to indicate no transmission in the corresponding symbol group.

In Example 6, the subject matter of Example 5 includes, wherein the RRC signaling includes an indication corresponding to a granularity parameter of the region of time-frequency resources.

In Example 7, the subject matter of Examples 5-6 includes, wherein the granularity parameter including a value of 0 indicates that 14 bits of a field in the PI-DCI have a one-to-one mapping with 14 groups of consecutive symbols of the portion of PRBs, and wherein the granularity parameter including a value of 1 indicates that 7 pairs of bits of a field in the PI-DCI have a one-to-one mapping with 7 groups of consecutive symbols of the portion of PRBs.

In Example 8, the subject matter of Examples 1-7 includes, wherein the processing circuitry is configured to encode the PI-DCI to avoid indicating a subset of the portion of PRBs that includes a synchronization signal (SS) block transmission.

In Example 9, the subject matter of Examples 1-8 includes, wherein the BWP of the region of time-frequency resources includes the CORESET.

In Example 10, the subject matter of Examples 1-9 includes, wherein the processing circuitry is configured to encode the PI to indicate the portion of PRBs that omit transmissions intended for the UE.

In Example 11, the subject matter of Examples 1-10 includes, wherein the portion of PRBs are to include an enhanced Mobile Broadband (eMBB) transmission, and wherein the PI in the PI-DCI indicates a location within the portion of the PRBs in which an ultra-reliable low latency communication (URLLC) transmission is to preempt the eMBB transmission.

In Example 12, the subject matter of Examples 1-11 includes, wherein the processing circuitry is configured to: puncture resource elements scheduled for the eMBB transmission within the portion of the PRBs; and configure the transceiver circuitry for transmission of the URLLC transmission in the punctured resource elements.

Example 13 is an apparatus of a user equipment (UE) comprising: memory; and processing circuitry, the processing circuitry configured to: decode radio resource control (RRC) signaling, received from a New Radio (NR) NodeB (gNB), the RRC signaling to configure the UE for monitoring a region of time-frequency resources for a preemption indication (PI), the RRC signaling including a bandwidth part (BWP) information element to configure a BWP of the region of time-frequency resources for monitoring for preemption indication downlink control information (PI-DCI); configure transceiver circuitry to receive signaling in a physical downlink control channel (PDCCH) in a control resource set (CORESET); and decode the PI-DCI from the received signaling, the PI-DCI including the PI to indicate a portion of physical resource blocks (PRBs) that omit transmissions intended for the UE, and wherein the memory is configured to store the PI.

In Example 14, the subject matter of Example 13 includes, wherein the BWP information element includes a frequency domain location, a bandwidth, and a subcarrier spacing of the BWP for a given numerology.

In Example 15, the subject matter of Examples 13-14 includes, wherein the processing circuitry is configured to: decode, from the RRC signaling, a preemption indication radio network temporary identifier (PI-RNTI) indicating preemption in a downlink (DL); and identify a cyclic redundancy check (CRC) scrambled by the PI-RNTI and decode the PI-DCI based on the PI-RNTI.

In Example 16, the subject matter of Examples 13-15 includes, wherein the region of time-frequency resources is defined by a starting position and a number of resource blocks within the BWP.

In Example 17, the subject matter of Examples 13-16 includes, wherein the processing circuitry is configured to decode, from the RRC signaling, an indication corresponding to a granularity parameter of the region of time-frequency resources.

In Example 18, the subject matter of Examples 13-17 includes, wherein the processing circuitry is configured to determine that a symbol group includes a transmission intended for the UE when the PI-DCI includes a bit value of 0, and determine that a symbol group omits transmissions intended for the UE when the PI-DCI includes a bit value of 1.

In Example 19, the subject matter of Examples 17-18 includes, wherein the processing circuitry is configured to determine that 14 bits of a field in the PI-DCI have a one-to-one mapping with 14 groups of consecutive symbols of the portion of PRBs when the granularity parameter includes a value of 0.

In Example 20, the subject matter of Examples 13-19 includes, wherein the processing circuitry is configured to determine that 7 pairs of bits of a field in the PI-DCI have a one-to-one mapping with 7 groups of consecutive symbols of the portion of PRBs when the granularity parameter includes a value of 1.

In Example 21, the subject matter of Examples 13-20 includes, wherein the portion of PRBs include an enhanced Mobile Broadband (eMBB) transmission, and wherein the processing circuitry is configured to determine, from the PI in the PI-DCI, a location within the portion of the PRBs in which an ultra-reliable low latency communication (URLLC) transmission preempts the eMBB transmission.

In Example 22, the subject matter of Examples 13-20 includes, wherein the apparatus further comprises two or more antennas and a transceiver, the two or more antennas and the transceiver configured to receive the RRC signaling and the signaling in the PDCCH of the CORESET.

In Example 23, the subject matter of Examples 13-21 includes, wherein the processing circuitry is a baseband processor.

Example 24 is a computer-readable hardware storage device that stores instructions for execution by one or more processors of a user equipment (UE), the instructions to configure the one or more processors to: decode radio resource control (RRC) signaling, received from a New Radio (NR) NodeB (gNB), the RRC signaling to configure the UE for monitoring a region of time-frequency resources for a preemption indication (PI), the RRC signaling including a bandwidth part (BWP) information element to configure a BWP of the region of time-frequency resources for monitoring for preemption indication downlink control information (PI-DCI); configure transceiver circuitry to receive signaling in a physical downlink control channel (PDCCH) in a control resource set (CORESET); and decode the PI-DCI from the received signaling, the PI-DCI including the PI to indicate a portion of physical resource blocks (PRBs) that omit transmissions intended for the UE.

Example 25 is a computer-readable hardware storage device that stores instructions for execution by one or more processors of a New Radio (NR) NodeB (gNB), the instructions to configure the one or more processors to: encode radio resource control (RRC) signaling to configure a user equipment (UE) for monitoring a region of time-frequency resources for a preemption indication (PI), the RRC signaling including a bandwidth part (BWP) information element to configure a BWP of the region of time-frequency resources for transmission of preemption indication downlink control information (PI-DCI); encode, for transmission to a group of UEs including the UE, the PI-DCI to include, the PI and to indicate a portion of physical resource blocks (PRBs) that omit transmissions intended for the UE; and configure transceiver circuitry to transmit the PI-DCI in a physical downlink control channel (PDCCH) in a control resource set (CORESET) to the UE.

Example 26 is at least one machine-readable medium including instructions that, when executed by processing circuitry, cause the processing circuitry to perform operations to implement of any of Examples 1-25.

Example 27 is an apparatus comprising means to implement of any of Examples 1-25.

Example 28 is a system to implement of any of Examples 1-25.

Example 29 is a method to implement of any of Examples 1-25.

What is claimed is:

1. An apparatus of a New Radio (NR) NodeB (gNB), the apparatus comprising:
one or more processors configured to:
encode radio resource control (RRC) signaling to configure a user equipment (UE) for monitoring a region of time-frequency resources within a bandwidth part (BWP) for a preemption indication (PI) via a group-common downlink control information (DCI), wherein the PI via group-common DCI (PI-DCI) is transmitted in a control resource set (COREST);
encode, for transmission to a group of UEs including the UE, the PI-DCI to indicate frequency domain resources that omit transmissions intended for the UE, wherein the transmission of one or more synchronization signal (SS) blocks in the frequency domain resources are not preempted; and
configure transceiver circuitry to transmit the PI-DCI in a physical downlink control channel (PDCCH) in the CORESET to the group of UEs.

2. The apparatus of claim 1, wherein the PI provides an indication of a slot, back in time relative to the slot carrying the PI, in which preemption occurs.

3. The apparatus of claim 1, wherein, when the CORESET in which the DCI-PI is transmitted and the resources to which the PI apply are in different BWPs, the resources to which PI applies are determined according to a numerology of the BWP in which the DCI-PI is transmitted.

4. The apparatus of claim 1, wherein, when the CORESET in which the DCI-PI is transmitted and the resources to which the PI apply are in different BWPs, the resources to which PI applies are determined according to a numerology of the BWP including the resources to which the PI applies.

5. The apparatus of claim 1, wherein the RRC signaling includes a preemption indication radio network temporary identifier (PI-RNTI) used for indicating preemption in a downlink (DL), and wherein the one or more processors are configured to encode the PI-DCI with a cyclic redundancy check (CRC) scrambled by the PI-RNTI.

6. The apparatus of claim 1, wherein the region of time-frequency resources is defined by a starting position and a number of resource blocks within the BWP.

7. The apparatus of claim 1, wherein the PI-DCI includes a bit value of 0 to indicate a transmission in a corresponding symbol group, and wherein the PI-DCI includes a bit value of 1 to indicate no transmission in the corresponding symbol group.

8. The apparatus of claim 1, wherein the RRC signaling includes an indication corresponding to a granularity parameter of the region of time-frequency resources.

9. A computer-readable hardware storage device that stores instructions for execution by one or more processors of a New Radio (NR) NodeB (gNB), the instructions to configure the one or more processors to:
encode radio resource control (RRC) signaling to configure a user equipment (UE) for monitoring a region of time-frequency resources within a bandwidth part (BWP) for a preemption indication (PI) via a group-common downlink control information (DCI), wherein the PI via group-common DCI (PI-DCI) is transmitted in a control resource set (COREST);
encode, for transmission to a group of UEs including the UE, the PI-DCI to indicate frequency domain resources that omit transmissions intended for the UE, wherein the transmission of one or more synchronization signal (SS) blocks in the frequency domain resources are not preempted; and
configure transceiver circuitry to transmit the PI-DCI in a physical downlink control channel (PDCCH) in the CORESET to the group of UEs.

10. The computer-readable hardware storage device of claim 9, wherein the PI provides an indication of a slot, back in time relative to the slot carrying the PI, in which preemption occurs.

11. The computer-readable hardware storage device of claim 9, wherein, when the CORESET in which the DCI-PI is transmitted and the resources to which the PI apply are in different BWPs, the resources to which PI applies are determined according to a numerology of the BWP in which the DCI-PI is transmitted.

12. The computer-readable hardware storage device of claim 9, wherein, when the CORESET in which the DCI-PI is transmitted and the resources to which the PI apply are in different BWPs, the resources to which PI applies are determined according to a numerology of the BWP including the resources to which the PI applies.

13. An apparatus of a user equipment (UE) comprising: processing circuitry configured to:
decode radio resource control (RRC) signaling, received from a New Radio (NR) NodeB (gNB), the RRC signaling to configure the UE for monitoring a region of time-frequency resources within a bandwidth part (BWP) for a preemption indication (PI) via a group-common downlink control information (DC), wherein the PI via group-common DCI (PI-DCI) is transmitted in a control resource set (CORESET);
configure transceiver circuitry to receive signaling in a physical downlink control channel (PDCCH) in the CORESET; and
decode the PI-DCI from the received signaling, the PI-DCI to indicate frequency domain resources that omit transmissions intended for the UE, wherein transmission of one or more synchronization signal (SS) blocks in the frequency domain resources is not preempted.

14. The apparatus of claim 13, wherein the PI provides an indication of a slot, back in time relative to the slot carrying the PI, in which preemption occurs.

15. The apparatus of claim 13, wherein, when the CORESET in which the DCI-PI is received and the resources to which the PI apply are in different BWPs, the resources to which PI applies are determined according to a numerology of the BWP in which the DCI-PI is received.

16. The apparatus of claim 13, wherein, when the CORESET in which the DCI-PI is received and the resources to which the PI apply are in different BWPs, the resources to which PI applies are determined according to a numerology of the BWP including the resources to which the PI applies.

17. The apparatus of claim 13, wherein the processing circuitry is configured to:
decode, from the RRC signaling, a preemption indication radio network temporary identifier (PI-RNTI) indicating preemption in a downlink (DL); and
identify a cyclic redundancy check (CRC) scrambled by the PI-RNTI and decode the PI-DCI based on the PI-RNTI.

18. The apparatus of claim 13, wherein the region of time-frequency resources is defined by a starting position and a number of resource blocks within the BWP.

19. The apparatus of claim 13, wherein the processing circuitry is configured to decode, from the RRC signaling, an indication corresponding to a granularity parameter of the region of time-frequency resources.

20. The apparatus of claim 13, wherein the processing circuitry is configured to:
determine that a symbol group includes a transmission intended for the UE when the PI-DCI includes a bit value of 0; and
determine that a symbol group omits transmissions intended for the UE when the PI-DCI includes a bit value of 1.

* * * * *

UNITED STATES PATENT AND TRADEMARK OFFICE
CERTIFICATE OF CORRECTION

| | | |
|---|---|---|
| PATENT NO. | : 11,683,145 B2 | Page 1 of 1 |
| APPLICATION NO. | : 17/536471 | |
| DATED | : June 20, 2023 | |
| INVENTOR(S) | : Gang Xiong et al. | |

It is certified that error appears in the above-identified patent and that said Letters Patent is hereby corrected as shown below:

In the Claims

Column 30
Claim 1, Line 53, Please delete "COREST" and substitute with --CORESET--.
Claim 1, Line 57, Please delete "the transmission" and substitute with --transmission--.

Column 31
Claim 9, Line 36, Please delete "COREST" and substitute with --CORESET--.
Claim 9, Line 40, Please delete "the transmission" and substitute with --transmission--.

Signed and Sealed this
Fifth Day of September, 2023

Katherine Kelly Vidal
*Director of the United States Patent and Trademark Office*